(12) United States Patent
Way

(10) Patent No.: US 10,721,180 B2
(45) Date of Patent: *Jul. 21, 2020

(54) RESOURCE PATH MONITORING

(71) Applicant: Ripple Luxembourg S.A., Luxembourg (LU)

(72) Inventor: Robert Way, Spring, TX (US)

(73) Assignee: RIPPLE LUXEMBOURG S.A., San Francisco, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 16/030,484

(22) Filed: Jul. 9, 2018

(65) Prior Publication Data

US 2018/0316624 A1     Nov. 1, 2018

Related U.S. Application Data

(63) Continuation of application No. 15/227,823, filed on Aug. 3, 2016, now Pat. No. 10,021,040.

(51) Int. Cl.
*H04L 12/923* (2013.01)
*H04L 12/26* (2006.01)
(Continued)

(52) U.S. Cl.
CPC ........ *H04L 47/762* (2013.01); *H04L 41/0896* (2013.01); *H04L 43/0817* (2013.01); *H04L 43/0894* (2013.01); *H04L 43/16* (2013.01); *H04L 67/10* (2013.01); *H04L 47/726* (2013.01); *H04L 47/748* (2013.01); *H04L 47/781* (2013.01)

(58) Field of Classification Search
CPC .......... H04L 12/2602; H04L 29/06027; H04L 41/0893
See application file for complete search history.

(56) References Cited

U.S. PATENT DOCUMENTS 5,063,506 A   11/1991   Brockwell
6,055,561 A    4/2000   Feldman
(Continued)

FOREIGN PATENT DOCUMENTS

AU        78300862        11/2001

OTHER PUBLICATIONS

International Preliminary Report on Patentability for Application No. PCT/EP2017/069628 dated Feb. 5, 2019, 8 pages.

(Continued)

*Primary Examiner* — Ranadhi Serrao
(74) *Attorney, Agent, or Firm* — Morris & Kamlay LLP

(57) ABSTRACT

Systems and techniques are provided for a resource distribution system. Selected resource paths in a resource transfer network may be monitored. A quantity of an intermediate resource type to transfer into resource pools in the resource transfer network may be determined. Each of the resource pools may be associated with a leg that can be part of a route with two legs for one or more of the selected resource paths. Instructions decrementing a register in a repository resource pool by the determined quantities of the intermediate resource type to be transferred into the resource pools in the resource transfer network and incrementing a register in each of the resource pools in the resource transfer network by the determined quantity of the intermediate resource type to be transferred into that resource pool when the determined quantity is greater than zero may be generated and caused to be executed.

20 Claims, 15 Drawing Sheets

(51) Int. Cl.
*H04L 12/24* (2006.01)
*H04L 29/08* (2006.01)
H04L 12/911 (2013.01)

(56) References Cited

U.S. PATENT DOCUMENTS

| | | |
|---|---|---|
| 6,259,988 B1 | 7/2001 | Galkowski |
| 6,724,881 B1 | 4/2004 | McAllister |
| 7,535,828 B2 | 5/2009 | Raszuk |
| 2003/0088529 A1 | 5/2003 | Klinker |
| 2003/0204619 A1 | 10/2003 | Bays |
| 2006/0239199 A1 | 10/2006 | Blair |
| 2006/0239201 A1 | 10/2006 | Metzger |
| 2007/0005801 A1 | 1/2007 | Kumar |
| 2011/0225086 A1 | 9/2011 | Ibasco |
| 2015/0081912 A1 | 3/2015 | Tan |

OTHER PUBLICATIONS

International Search Report and Written Opinion dated Aug. 31, 2017 as received in Application No. PCT/EP2017/069628.

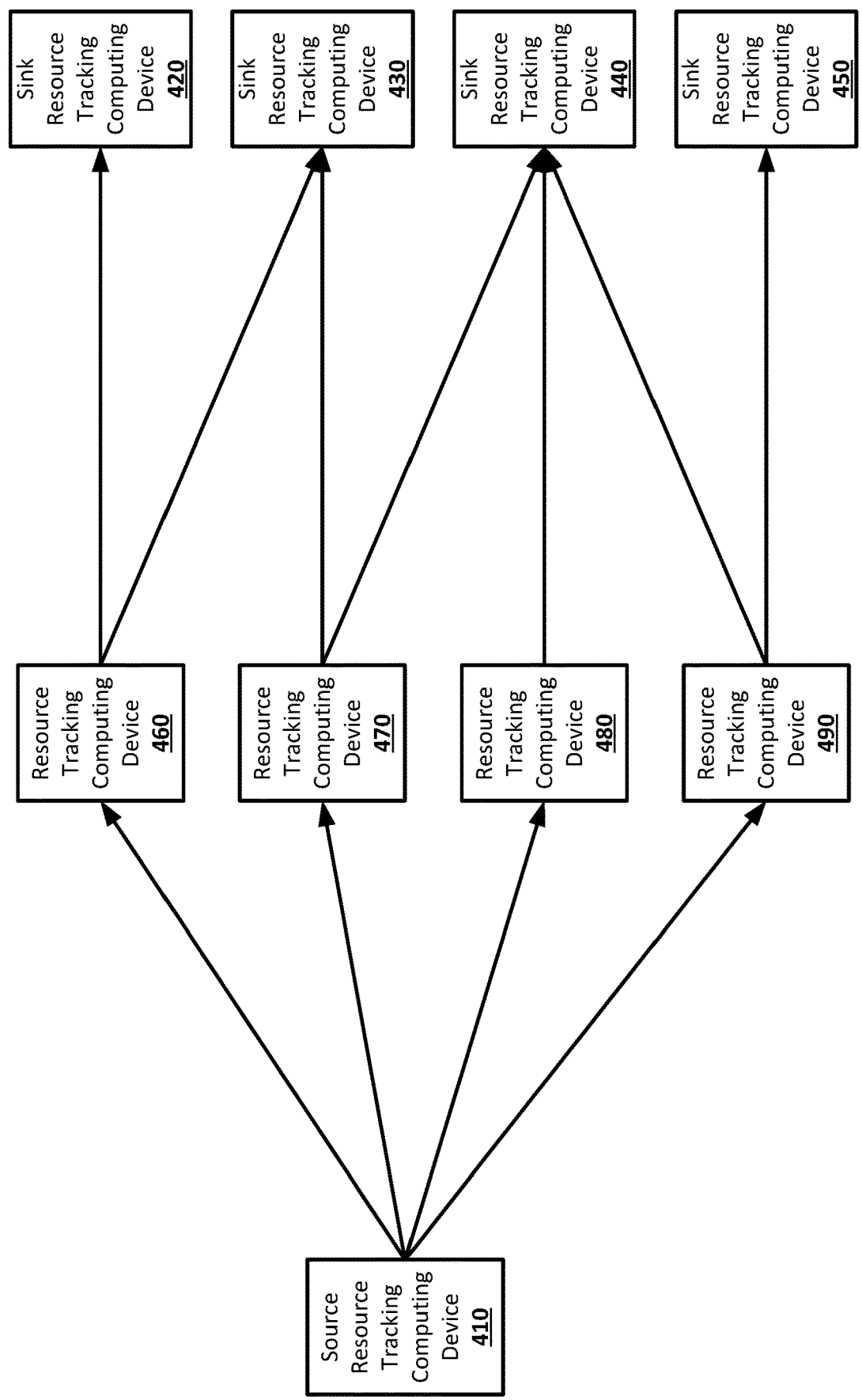

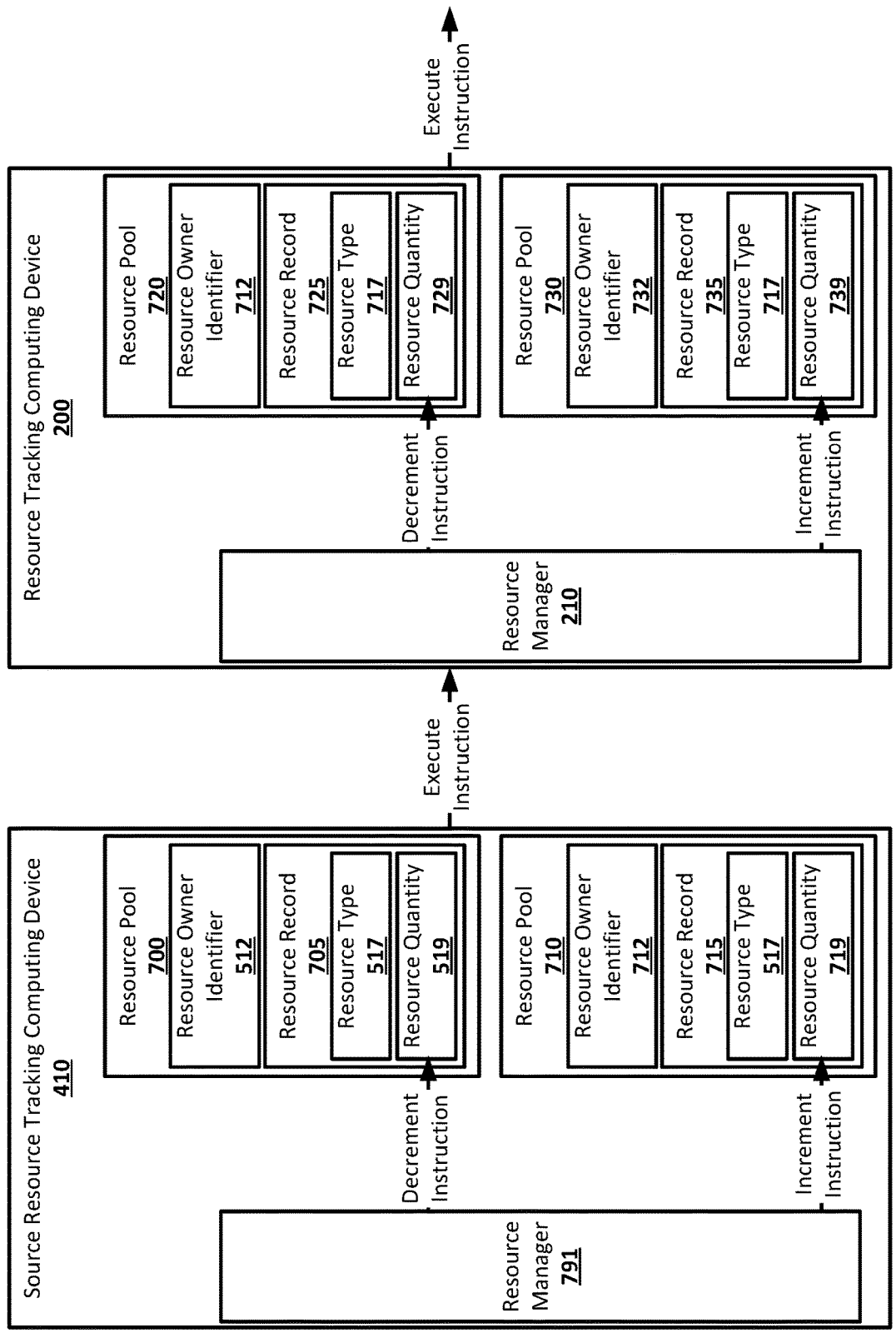

RESOURCE PATH MONITORING

BACKGROUND

Resources may be transferred across various network paths. A first node in the network may transfer resources to a second node in the network. In some cases, the first node may transfer out a first type of resource, but the second node may only wish to receive a second type of resource. An intermediate may be needed to accept the first type of resource from the first of the two nodes and send out the second type of resource to the second of the two nodes to complete the resource transfer. The paths between the first and second nodes may be go through a limited number of intermediate nodes, and certain intermediate nodes may only handle the sending or receiving of certain resource types. This may increase the cost of the resource transfer between the two nodes, as the intermediate nodes may impose their own costs on resource transfers that pass through them, and there may be a limited number of intermediate nodes to choose from.

BRIEF SUMMARY

According to an embodiment of the disclosed subject matter, an indication of an available leg for a resource path may be received. The resource path may include a front resource type and a back resource type. The available leg may be associated with a resource pool including a register indicating a quantity of an intermediate resource type. The available leg may be used to form a route for half of the resource path. A total quantity of an intermediate resource type transferrable either out of or into the resource pool associated with the leg may be determined from the indication of the available leg. A quantity of the intermediate resource type to be transferred into the resource pool associated with the leg may be determined based on the total quantity of the intermediate resource type transferrable either out of or into resource pool associated with the leg. Instructions decrementing a register in a repository resource pool by the determined quantity of the intermediate resource type to be transferred into the resource pool associated with the leg and incrementing the register in the resource pool associated with the leg by the determined quantity of the intermediate resource type to be transferred into the resource pool associated with the leg may be generated and caused to be executed.

Selected resource paths in a resource transfer network may be monitored. A quantity of an intermediate resource type to transfer into resource pools in the resource transfer network may be determined. Each of the resource pools may be associated with a leg that can be part of a route with two legs for one or more of the selected resource paths. Instructions decrementing a register in a repository resource pool by the determined quantities of the intermediate resource type to be transferred into the resource pools in the resource transfer network and incrementing a register in each of the resource pools in the resource transfer network by the determined quantity of the intermediate resource type to be transferred into that resource pool when the determined quantity is greater than zero may be generated and caused to be executed.

A computing device may monitor selected resource paths in a resource transfer network. The computing device may determine a quantity of an intermediate resource type to transfer into each of a number of resource pools in the resource transfer network. Each of the resource pools may be associated with a leg that can be part of a route with two legs for the selected resource paths. The computing device may generate and cause to be executed instructions decrementing a register in a repository resource pool by the determined quantities of the intermediate resource type to be transferred into the resource pools in the resource transfer network and incrementing a register in each of the resource pools in the resource transfer network by the determined quantity of the intermediate resource type to be transferred into that resource pool when the determined quantity is greater than zero.

Systems and techniques disclosed herein may allow for a resource distribution system. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 4 shows an example arrangement suitable for a resource distribution system according to an implementation of the disclosed subject matter.

FIG. 7A shows an example arrangement suitable for a resource distribution system according to an implementation of the disclosed subject matter.

DETAILED DESCRIPTION

Figure 1:
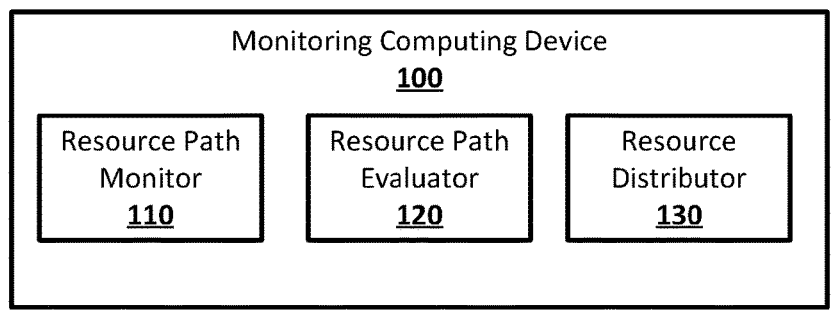
FIG. 1 shows an example system suitable for a resource distribution system according to an implementation of the disclosed subject matter.

According to embodiments disclosed herein, a resource distribution system may allow for the distribution of resources to resource pools that are used that are used to transfer resources across resource types. A resource monitoring system, which may be any suitable computing device, may monitor the availability and use of routes along paths through resource tracking systems. The resource tracking systems may be any suitable computing devices for tracking the ownership of resources. The resource monitoring system may cause the transfer of resources to a resource pool on a resource tracking system based on any suitable criteria, such as how many routes are offered through the resource pool, or the volume of resources that passes through the resource pool.

Resource transfers may involve a change of resource types during the transfer. Resource pools controlled by an intermediary party may be used to effect the change of resource type. For example, a source party may wish transfer out a first resource type from a resource pool controlled by the source party, while a sink party may request to receive a second resource type at a resource pool controlled by the sink party. A quantity of the first resource type may be sent to a resource pool controlled by an intermediary party, which may keep the quantity of the first resource type and may transfer out a quantity of the second resource type from another resource pool controlled by the intermediary party to a resource pool controlled by the sink party. There may be a cost for the use of the resource pools controlled by the intermediary party in the transfer. For example, the quantity of the first resource type transferred out by the source party and kept in a resource pool controlled by the intermediary party may be greater than the quantity of the first resource type that the source party would have transferred directly to the resource pool of the sink party had the sink party request the first resource type.

There may be a number of different resource types which can be transferred. For example, a resource may a computational resource such as processor time, volatile and non-volatile storage space, and network bandwidth. Resource transfers may take place across resource paths. A resource path may be a pairing of two resource types, a front resource type and a back resource type. For example, a resource path may include a first resource type, which may be the front resource type for the resource path, and a second resource type, which may be the back resource type for the resource path. Resource transfers may take place across a resource path with either the front resource type being transferred out and the back resource type being transferred in, forming a first half of the resource path, or the back resource type being transferred out and the front resource type being transferred in, forming a second half of the resource path.

A resource path may include a number of different routes. A route may include intermediate resource pools, controlled by intermediary parties, through which resources are transferred, and through which a change of resource types may take place. The intermediate resource pools may allow a source party to have the front resource type for the resource path transferred out of its resource pool while the resource pool controlled by the sink party may receive the back resource type for the resource path. Different routes may include different intermediary parties. For example, a first route for a resource path may include a first intermediary party, while a second route for the resource path may include a second intermediary party. Some routes may include more than one intermediary party. The use of an intermediate resource pool controlled by an intermediary party in a route may incur a cost.

Routes for a resource path may include legs. Each leg of a route may involve a change from one resource type to another resource type. The change may be made through resource pools controlled by intermediary parties. For example, the completion of a leg may include two sets of resource transfers using four resource pools on two resource tracking systems. A first resource type may be transferred out of a first resource pool and into a second resource pool on a first resource tracking system. A second resource type may be transferred out of a third resource pool and into a fourth resource pool on a second resource tracking system, completing the leg. The second and third resource pools may be controlled by the same party, which may be, for example, an intermediary party. The second and third resource pools may make up the leg, and may be an incoming resource pool and outgoing resource pool for the leg. The first resource pool used in completing a leg may be, for example, a resource pool controlled by a source party that is making use of the leg for a resource transfer to a sink party, or by another intermediary party when the leg is not the first leg of route with more than one leg. The fourth resource pool used in completing the leg may be, for example, a resource pool controlled by a sink party, or a by another intermediary party when the leg is not the last leg of a route with more than one leg. The resource pools for a leg may be on separate resource tracking systems, or may be on the same resource tracking system. Every leg may have its own staring resource type and ending resource type. The starting resource type of a leg may be the resource type transferred from the first resource pool of the leg to the second, or incoming, resource pool of the leg, and the ending resource type of the leg may be the resource type transferred from the third, or outgoing, resource pool to the fourth resource pool of the leg.

A route for the first half of a resource path may include one leg that changes the front resource type for the resource type to the back resource type for the resource path. The starting resource type for the leg may be the same as the front resource type for the resource path, and the ending resource type for the leg may be the same as the back resource type for the resource path. For example, the front resource type may be transferred to a resource pool controlled by an intermediary party, the incoming resource pool for the leg, from a resource pool controlled by the source party. The back resource type may then be transferred from a resource pool controlled by the intermediary party, the outgoing resource pool for the leg, to a resource pool controlled by a sink party, effecting the change of resource type from the front resource type to the back resource type and completing the resource transfer across resource path. Similarly, a route for the second half of a resource path may include on leg that changes the back resource type for the resource path to the front resource type for the resource path.

A route for a first half of a resource path may include two legs. The starting resource type for the first leg may be the same as the front resource type for the resource path, and the ending resource type for the second leg may be the same as the back resource type for the resource path. An intermediate resource type may be the ending resource type for the first leg and the starting resource type for the second leg. To form a route with more than one leg, consecutive legs may need to overlap. The incoming resource pool for a leg may need to be on the same resource tracking system as the outgoing resource pool for the previous leg, and both may need to include the intermediate resource type, so that the completion of one leg begins the subsequent leg. For example, a front resource type may be transferred to a resource pool controlled by an intermediary party, the incoming resource pool for the first leg, from a resource pool controlled by the source party. An intermediate resource type may be transferred from a resource pool controlled by the intermediary party, the outgoing resource pool for the first leg, to a resource pool controlled by a second intermediary party, the incoming resource pool for the second leg, ending the first leg and starting the second leg. A back resource type may then be transferred from a resource pool controlled by the second intermediary party, the outgoing resource pool for the second leg, to a resource pool controlled by a sink party, ending the second leg and effecting the change of resource type from the front resource type to the back resource type. This may complete a resource transfer across the resource path using a route with two legs. Similarly, a route for the second half of a resource path may include two legs, where the staring resource type of the first leg is the back resource type for the resource path and the ending resource type of the second leg is the front resource type for the resource path. In some implementations, a route that uses more than one leg may not have a separate resource pool controlled by a separate intermediary party for each leg. For example, on a route with two legs, a single intermediary party may control a resource pool which may be both the outgoing resource pool for the first leg and the incoming resource pool for the second leg, as well as the outgoing resource pool for the second leg out of which the ending resource type is transferred. There may still be separate costs for each leg of the route. A single resource pool may also be an incoming resource pool for one leg, and outgoing resource pool for another, separate, leg.

Every leg may have its own associated cost when effecting a change from one resource type to another resource type. For example, on a route with two legs for the first half of a resource path, the cost of the first leg may be the difference between the quantity of the first leg's starting resource type, which may be, for example, the front resource type for the resource path, that is transferred from the first resource pool of the leg to the incoming resource pool of the leg and the quantity of the first leg's starting resource type that could have been transferred to the first leg's fourth resource pool, the incoming resource pool for the second leg, had the intermediate party controlling the fourth resource pool accepted the starting resource type. The cost of the second leg may be the difference between the quantity of the second leg's starting resource type that is transferred from the first resource pool of the leg, the outgoing resource pool of the first leg, to the second resource pool of the leg, the incoming resource pool of the second leg, and the quantity of the second leg's starting resource type that could have been transferred to the second leg's fourth resource pool had the sink party controlling the fourth resource pool accepted the starting resource type for the second leg in place of the ending resource type, which may be, for example, the back resource type for the resource path.

A group of legs that allow resource transfers with changes in resource type may form a resource transfer network. The resource transfer network may include any number of resource paths, each including any number of routes made up of the legs of the resource transfer network. The resource paths available on a resource transfer network may be based on the type of resource changes that can be effected by the legs of the resource transfer network. For example, for a resource path with a first resource type as its front resource type and a second resource type as its back resource type to be available on a resource transfer network, the resource transfer network may need to include either a one-leg or two-leg route for each half of the resource path. For the first half of the resource path, the resource transfer network may need to include either a leg that has the first resource type as its starting resource type and the second resource type as its ending resource type, or two legs, where one of the two legs has the first resource type as its starting resource type and an intermediate resource type as its ending resource type and the other of the two legs includes the intermediate resource type as its starting resource type and the second resource type as its ending resource type. For the second half of the resource path, the resource transfer network may need to include either a leg that has the second resource type as its starting resource type and the first resource type as its ending resource type, or two legs, where one of the two legs has the second resource type as its starting resource type and an intermediate resource type as its ending resource type and the other of the two legs includes the intermediate resource type as its starting resource type and the first resource type as its ending resource type. In some implementations, only either the first half or the second half of a resource path may be available in a resource transfer network.

The resource transfer network may include a number of resource tracking systems. A resource tracking system may be any suitable system for tracking resources controlled by various parties, and for transferring resources between parties. A resource tracking system may be any suitable computing device or system, with any suitable combination of hardware and software, such as, for example, a system run by a financial institution, a hardware or software component of a server system or computing device, or a distributed system, such as, for example, a cryptocurrency ledger or blockchain which may exist on a number of different computing devices and be reconciled in a collaborative fashion, or may be centralized. A resource tracking system may track the control of resources for any number of parties. A party, such as, for example, a source party, intermediary party, or sink party, may have a resource pool on a resource tracking system. The resource pool for a party on a resource tracking system may include an identification of the party and quantities of each type of resource controlled by the party and tracked by the resource tracking system. A party may have more than one resource type tracked by an individual resource tracking system.

A resource tracking system may track any type of resource. For example, a resource may be a computational resource such as processor time, volatile and non-volatile storage space, and network bandwidth. The record of ownership and quantity of a resource by the resource tracking system may also be the resource itself, or may be a record of ownership of a resource that exists separately.

A resource tracking system may effect the transfer of resources between resource pools by modifying the quantities of resources recorded as controlled by the parties who control the resource pools involved in the transfer For example, to transfer resources from a source resource pool to destination resource pool, the resource tracking system may, simultaneously or sequentially, decrease the quantity of the resource recorded as owned by the party which controls the source resource pool and increase the quantity of the resource recorded as owned by the party which controls the destination resource pool. The quantity of the resource recorded in the source resource pool may be decreased by the same quantity that the quantity of the resource recorded in the destination resource pool is increased. A resource tracking system may be able to increase and decrease the quantity of resources that are tracked in resource pools on the resource tracking system, and may only be able to transfer resources between two parties who both have resource pools on the resource tracking system.

The resource transfer network may be accessible to various parties, which may use the resource transfer network to transfer resources to and from resource pools. For example, a source party in a resource transfer may control a source resource tracking system that may have access to the resource transfer network. The source resource tracking system may include any number of resource pools, which may be controlled by the source party, by some other party on whose behalf the source party may act, or by an intermediary party in the resource transfer network. The source party may be any suitable person, group, organization, or computer hardware and software. An intermediary party in a resource transfer network may control resource pools which may be part of the legs of the resource transfer network. These resource pools may be located on any number of resource tracking systems in the resource transfer network. For example, an intermediary party may control a resource tracking system, along with resource pools on the resource tracking system. Other parties, such as source parties, may also control resource pools on the resource tracking system controlled by the intermediary party. An intermediary party may also control resource pools on resource tracking system not controlled by the intermediary party. For example, a resource tracking system may include any number of resource pools controlled by any number of intermediary parties. Each resource pool may be a part of any number of legs for any number of routes for any suitable resource paths through the resource transfer network. A sink party in resource transfer network may control a resource pool on a sink resource tracking system. A sink resource tracking system may also include resource pools controlled by intermediary parties.

For a source party to use a particular route on a resource path of the resource transfer network, the source party may need to control a resource pool on the same resource tracking system as an intermediary party that also controls a resource pool that can be used at the end of the first leg of the route. For example, if the route has one leg, the source party may need to control a resource pool on the same resource tracking system as the leg's intermediary party, which may also control a resource pool on the same resource tracking system as the sink party for the route. If the route has two legs, the source party may need to control a resource pool on the same resource tracking system as the leg's intermediary party, which may also control a resource pool on the same resource tracking system as a second intermediary party which controls a resource pool on the same resource tracking system as the sink party for the route. The first leg of the route may be from the resource pool controlled by the source party to an incoming resource pool controlled by the second intermediary party. The second leg of the route may be from an outgoing resource pool controlled by the first intermediary party to the resource pool of the sink party. The first and second leg may overlap at the resource transfer from the resource pool controlled by the first intermediary party to the resource pool controlled by the second intermediary party, which may be both the last resource transfer of the first leg and the first resource transfer of the second leg, and may involve the transfer of an intermediate resource type.

For an intermediary party to offer a leg of a route on a resource path, the intermediary party may need to control a resource pool on the same resource tracking system as a source party and a sink party, for example, for a route with one leg, or a source party and another intermediary party or another intermediary party and a sink party, for example, for a route with two legs. For routes with more than two legs, an intermediary party may offer a leg by controlling resource pools on the same resource tracking system as two intermediary parties. Intermediary parties may offer any number of legs in a resource transfer network. Any leg offered by an intermediary party may be part of any number of routes on any number of resource paths. For example, a leg offered by an intermediary party between resource pools of the intermediary party and a resource pool of a sink party. Every leg may be associated with its resource pool on a resource tracking system that is not the source or sink resource tracking system. For example, a leg offered by an intermediary party with an incoming resource pool on a source resource tracking system and outgoing resource pool that is not on the sink resource tracking system may be associated with its outgoing resource pool. Similarly, a leg offered by an intermediary party with an incoming resource pool that is not on a source resource tracking system and an outgoing resource pool that is on a sink resource tracking system may be associated with its incoming resource pool.

A party, such as a source party, may select a route to use for a specific resource path through a resource transfer network based on the costs of the legs of the route. Available legs in the resource transfer network and their costs may be advertised, such that the source party, for example, through the resource tracking system, may be able to determine and evaluate the costs of different routes, using different legs, for the various resource paths of the resource transfer network. The volume of resources that may be transferred using the leg may also be advertised, as different legs with the same starting resource type and ending resource type may be able to handle transfers of different amounts of either resource type. The source party may select the route with the lowest cost, based on the costs of the leg or legs of the route, that is available to the source party and has legs that can handle a large enough volume to transfer the quantities of the starting resource type and ending resource type that the source party wishes to transfer. The advertisement of a leg may be based on the resource pool with which the leg is associated. For example, a leg that starts with the starting resource type of a resource path and ends with an intermediate resource type may be associated with the outgoing resource pool out of which the intermediate resource type will be transferred at the end of the leg. The leg may be advertised based on the volume of the intermediate resource type that may be transferred out of the leg's outgoing resource pool and the related volume of the starting resource type that will need to be transferred the leg's incoming resource pool to start the leg. A leg that starts with an intermediate resource type may be associated with the incoming resource pool into which the intermediate resource type will be transferred at the beginning of the leg, and may be advertised based on the volume of the intermediate resource type that may need to be transferred into the leg's incoming resource pool to start of the leg, and the related volume of the ending resource type that will be transferred out of the leg's outgoing resource pool to end the leg.

A monitoring computing device may monitor a resource transfer network. The monitoring computing device may be any suitable computing device, with any suitable combination of hardware and software, for monitoring various aspects of a resource transfer network. The monitoring computing device may be associated with a resource pool in the resource transfer network. The resource pool associated with the monitoring computing device may be a repository resource pool located on a resource tracking system which may be, for example, an intermediate resource type tracking system, and may be operated by the same party as the monitoring computing device. The intermediate resource type tracking system may include resource pools controlled by other parties, including intermediary parties. The intermediary parties may also control resource pools on other resource tracking systems on which source parties and sink parties control resource pools. The resource pools on the intermediate resource type tracking system may include quantities of an intermediate resource type, which may be used on routes with two legs.

The monitoring computing device may, through monitoring of the resource transfer network, determine the costs and volumes of the legs advertised on the resource transfer network. The monitoring computing device may determine the costs and volumes of all, or of any subset of, the legs advertised on the resource transfer network. For example, the monitoring computing device may determine the costs and volumes only for legs that may be used to form routes for selected resource paths. The legs may be advertised in any suitable manner. For example, the legs may be advertised actively, for example, through the sending of communications across various systems in the resource transfer network, or passively, for example, through the posting of available legs to a designated system, network-accessible location, or shared memory space in the resource transfer network.

The monitoring computing device may, after monitoring the resource transfer network for any suitable time period, and after the elapsing of any suitable time period, transfer quantities of the intermediate resource type from the repository resource pool to other resource pools on the intermediate resource type tracking system. The transfer may occur at the end of a time period that may be a distribution period. The quantity of the intermediate resource type transferred to a resource pool from the repository resource pool may be determined in any suitable manner. For example, the monitoring computing device may determine a total quantity of the intermediate resource type to be transferred out of the repository resource pool at the end of a distribution period. This total quantity may be a reservoir resource quantity. The monitoring computing device may select any number of resource paths in the resource transfer network, for example, from the resource paths that were monitored during the distribution period. For each selected resource path in the resource transfer network, the monitoring computing device may determine which resource pools on the intermediate resource type tracking system were associated with legs that could have been used to form routes with more than one leg for the selected resource path during the distribution period. The monitoring computing device may then determine a total volume for each of these resource pools, which may be the total volume of the intermediate resource type that could be transferred through the routes formed using the leg with which the resource pool is associated, excluding the volume of any such routes with costs higher than some threshold, or backstop, cost. The total volume may be determined over a specified time period, which may be a monitoring period and may be some portion of the distribution period. The distribution period and monitoring period may be based on the elapsing of a certain amount of time, or on the occurrence of any suitable event. The threshold, or backstop, cost may be, for example, the cost of a selected route of the resource transfer network with only one leg for the selected resource path. The one leg of the selected route may use resource pools that are not on the intermediate resource type tracking system.

The monitoring computing device may determine, for each resource pool, the percentage of the reservoir resource quantity that may be transferred to that resource pool. Each selected resource path may be assigned some percentage of the reservoir resource quantity. The percentage of the of the reservoir resource quantity that may be transferred to a resource pool may be the total volume determined for that resource pool as a percentage of the total volume determined for all resource pools on the intermediate resource type tracking system for the selected resource path, as a percentage of the percentage of the reservoir resource quantity assigned to the selected resource path. This percentage may be determined for every resource pool that is associated with a leg for a selected resource path, and for every selected resource path. The same resource pool may have percentages determined for multiple selected resource paths if the resource pool is associated with a leg that can be used to form a route for those selected resource paths.

After determining the percentage for resource pools on the intermediate resource type tracking system, the monitoring computing device, or other suitable computing device associated with the repository resource pool, may cause transfers of the intermediate resource type to the resource pools for which percentages were determined. The resource transfer quantities may be based on the determined percentages and the reservoir resource quantity. For example, the quantity of resources transferred to a resource pool may be determined by multiplying that resource pool's percentage by the reservoir resource quantity. The resource transfers may result in the reservoir resource quantity of the intermediate resource type being transferred out of the repository resource pool and distributed across other resource pools on the intermediate resource type tracking system.

The reservoir resource quantity may be determined in any suitable manner. For example, before the start of a first distribution period, the reservoir resource quantity may be determined based on resource transfers that use the selected resource paths through the resource transfer network over a time period of the same length as a distribution period. For each selected resource path, the monitoring computing device may monitor resource transfers that use any route across the resource path. The total quantity of the front resource type that is transferred in at the start of the first half of the selected resource path may be reduced by the total quantity of the front resource type that is transferred out at the end of the second half of the selected resource path, and if the result is less than zero, the absolute value of the result may be the net transfer amount for the front resource type.

Otherwise, if the result is zero or greater, the net transfer amount may be zero. The total quantity of the back resource type transferred in at the start of the second half of the selected resource path may be reduced by the total quantity of the back resource type that is transferred out at the end of the first half of the selected resource path, and if the result is less than zero, the absolute value of the result may be the net transfer amount for the net transfer amount for the back resource type. Otherwise, if the result is zero or greater, the net transfer amount may be zero. The net transfer amounts for the front and back resource types may each be converted, using any suitable conversion factor, to an amount of the intermediate resource type, resulting in a net intermediate resource type amount. The net intermediate resource type amounts may be summed together across every selected resource path, resulting in the reservoir resource quantity that will be distributed at the end of the first distribution period.

For subsequent distribution periods, the reservoir resource quantity may be adjusted. For example, the monitoring computing device may determine that a resource transfer in the resource transfer network used a route with a cost higher than the threshold, or backstop, cost. This may indicate that the reservoir resource quantity may need to be increased for the next distribution period. The increase may be based on, for example, the percentage by which the current total volume of all legs available for the resource path where a resource transfer used a route with a higher cost than the backstop cost exceeds the net intermediate resource type amount for the resource path from the previous distribution period. The current total volume for the resource path may be the total volume available through all resource pools on the intermediate resource type tracking system that are associated with a leg that can be used to form a route for the resource path added to the total volume available through any other resource pool in the resource transfer network which may be part of a one-leg route for the resource path. The volume of a route may only be added to the total volume for the resource path if the route costs less than the backstop cost. The total volume through resource pools that are not on the intermediate resource type tracking system may be in amounts of a resource type other than the intermediate resource type. The amounts may be converted to the intermediate resource type using any suitable conversion factor, in order to allow for addition.

The monitoring computing device may determine that, for some of the selected resource paths, there are legs associated with resource pools on the intermediate resource type tracking system which do not get used as part of a route for any resource transfer that takes place during the distribution period. This may indicate that the reservoir resource quantity may need to be decreased for the next distribution period. The decrease may be based on, for example, the percentage by which the net intermediate resource type amount for the resource path from the previous distribution period exceeds the current total volume of all legs available for the resource path that can be used to form routes with a cost less than the backstop cost. The current total volume for the resource path may be the total volume available through all resource pools on the intermediate resource type tracking system that are part of a leg that can be used to form a route for the resource path added to the total volume available through any other resource pool in the resource transfer network which may be part of one leg route for the resource path. The volume of a route may only be added to the total volume for the resource path if the route costs less than the backstop cost. The total volume through resource pools that are not on the intermediate resource type tracking system may be in amounts of a resource type other than the intermediate resource type. The amounts may be converted to the intermediate resource type using any suitable conversion factor, in order to allow for addition.

FIG. 1 shows an example system suitable for a resource distribution system according to an implementation of the disclosed subject matter. A monitoring computing device 100 may include a resource path monitor 110, a resource path evaluator 120, and a resource distributor 140. The monitoring computing device 100 may be any suitable computing device, such as, for example, a computer 20 as described in FIG. 13, or component thereof, for implementing the resource path monitor 110, the resource path evaluator 120, and the resource distributor 140. The monitoring computing device 100 may be a single computing device, or may include multiple connected computing devices, and may be, for example, a laptop, a desktop, an individual server, a server farm, or a distributed server system, or may be a virtual computing device or system. The monitoring computing device 100 may be part of a computing system and network infrastructure, or may be otherwise connected to the computing system and network infrastructure. The resource path monitor 110 may be any suitable combination of hardware and software on the monitoring computing device 100 for monitoring various aspects of resource paths in a resource transfer network, including resource transfers occurring through the resource paths of a resource transfer network and routes and legs available for the resource paths in the resource transfer network. The resource path evaluator 120 may be any suitable combination of hardware and software on the monitoring computing device 100 for evaluating resource paths available in a resource transfer network based on aspects of the resource paths determined by the resource path monitor. The resource distributor 130 may be any suitable combination of hardware and software on the monitoring computing device 100 for determining and effecting a distribution of resources to resource pools on a resource tracking system in the resource transfer network, for example, based on the evaluation of resource paths by the resource path evaluator 120.

The resource path monitor 110 may be any suitable combination of hardware and software on the monitoring computing device 100 for monitoring various aspects of resource paths in a resource transfer network, including resource transfers occurring through the resource paths of a resource transfer network and routes and legs available for the resource paths in the resource transfer network. The resource path monitor 110 may monitor any suitable resource transfer network, with any suitable number of resource tracking systems. The resource path monitor 110 may be able to determine, based on monitoring of a resource transfer network, the resource paths that are available on the resource transfer network, the legs and routes which may be part of each available resource path, and the resource tracking systems and resource pools which are parts of the available legs. The resource path monitor 110 may be able to determine the advertised costs and volumes of the available legs for the resource transfer network. The resource path monitor 110 may be able to monitor the resource transfers that take place in a resource transfer network, including the legs, with costs, and associated resource pools used by a resource transfer, and the volume of resources transferred by a resource transfer. The resource path monitor 110 may monitor the resource transfer network using, for example, a connection between the monitoring computing device 100 and a public or private communications network on which computing devices for the resource transfer network communicate. The resource path monitor 110 may monitor the resource transfer network through active monitoring of the activity of the computing devices in the resource transfer network, or through passive monitoring, for example, being sent reports of activity of the computing devices in the resource transfer network by the computing devices, or by other monitoring computing devices.

The resource path evaluator 120 may be any suitable combination of hardware and software on the monitoring computing device 100 for evaluating resource paths available in a resource transfer network based on aspects of the resource paths determined by the resource path monitor. The resource path evaluator 120 may be able to determine, for example, the total quantity of resources that could have been transferred through a resource pool that is part of a leg that can form a route for a resource path monitored by the resource path monitor 110, based on the advertised volumes as determined by the resource path monitor 110. The resource path evaluator 120 may be able to compare the costs of routes on a resource path. This may allow the resource path evaluator 120 to determine the total quantity of an intermediate resource type that could be transferred through a particular resource pool as part of routes that costs less than some threshold, or backstop, cost for routes for a particular resource path. The resource path evaluator 120 may be able to determine the net transfer amounts for front and back resource types for a resource path. The resource path evaluator 120 may perform evaluations based on data gathered by the resource path monitor 110 over any suitable period of time, such as, for example, the distribution period, the monitoring period, or any other suitable period of time.

The resource distributor 130 may be any suitable combination of hardware and software on the monitoring computing device 100 for determining and effecting a distribution of resources to resource pools on a resource tracking system in the resource transfer network, for example, based on the evaluation of resource paths by the resource path evaluator 120. The resource distributor may 130 may, for example, be able to use total quantities and net transfer amounts determined by the resource the resource path evaluator 120 to determine a reservoir resource quantity for an intermediate resource type, and to determine the distribution of the reservoir resource quantity of the intermediate resource type to resource pools in a resource transfer network. The resource distributor 130 may effect the distribution of the reservoir resource quantity of the intermediate resource type by, for example, transmitting appropriate instructions to a resource tracking system. The instructions may indicate the quantities of the intermediate resource type to be transferred from a resource pool that may be controlled by the same party that controls the monitoring computing device 100 to resource pools controlled by various other parties. The resource distributor 130 may effect the distribution of the intermediate resource type at any suitable time, such as, for example, at the end of a distribution period.

Figure 2:
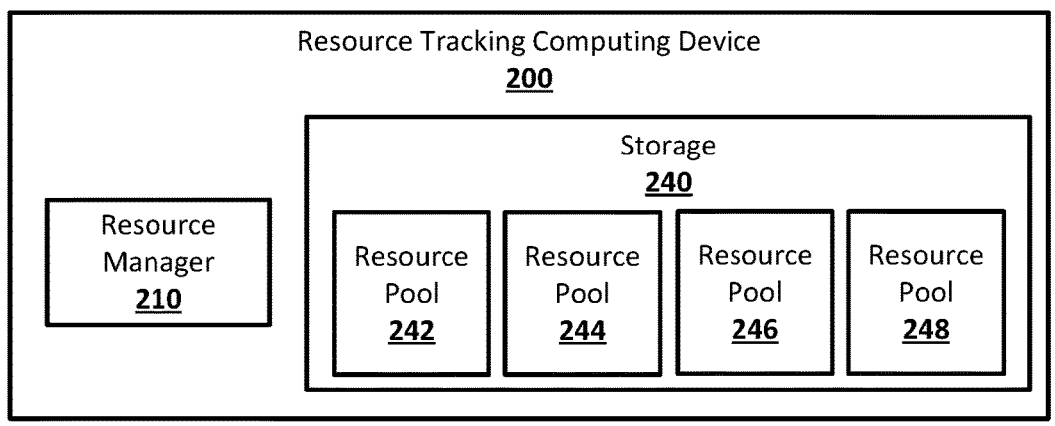
FIG. 2 shows an example system suitable for a resource distribution system according to an implementation of the disclosed subject matter.

FIG. 2 shows an example system suitable for a resource distribution system according to an implementation of the disclosed subject matter. A resource tracking computing device 200 may include a resource manager 210 and a storage 240. The resource tracking computing device 200 may be any suitable computing device, such as, for example, a computer 20 as described in FIG. 13, or component thereof, for implementing the resource manager 210 and the storage 240. The resource tracking computing device 200 may be a single computing device, or may include multiple connected computing devices, and may be, for example, a laptop, a desktop, an individual server, a server farm, or a distributed server system, or may be a virtual computing device or system. The resource tracking computing device 200 may be part of a computing system and network infrastructure, or may be otherwise connected to the computing system and network infrastructure. The resource manager 210 may be any suitable combination of hardware and software on the resource tracking computing device 200 for managing resources belonging to various parties and tracked by the resource tracking computing device 200. The resources may be tracked in resource pools, such as, for example, the resource pools 242, 244, 246, and 248 in the storage 240. The storage 240 may store the resource pools, such as the resource pools 242,244, 246, and 248, for the various parties with resource tracked by the resource tracking computing device 200. The resource pools 242, 244, 246, and 248 may be records of resources controlled by parties and tracked by the resource tracking computing device 200, including the types and quantities of the resources, and an identification of the party that controls the resources recorded by the resource pool. The resource tracking computing device 200 may be, for example, an intermediate resource type tracking system, which may or may not be affiliated with or belong to a particular person or organization, or may be a component of a server system.

The resource manager 210 may be any suitable combination of hardware and software on the resource tracking computing device 200 for managing resources tracked by the resource tracking computing device 200. The resource manager 210 may be able to receive instructions to perform resource transfers between resource pools, such as the resource pools 242, 244, 246, and 248, on the resource tracking computing device 200. The instructions, which may be execute instructions for resource transfers, may indicate that resources tracked by the resource tracking computing device 200 are to be transferred from one resource pool on the resource tracking computing device 200 to another resource pool on the resource tracking computing device 200. The resource manager 210 may be able to receive an execute instruction and execute the transfer of resource. The resource manager 210 may be able to transfer resources between resource pools, such as the resource pool 242 and the resource pool 244, by decrementing the quantity of the resources in one resource pool and incrementing the quantity of the resources in the other resource pool by the same quantity.

Figure 3:
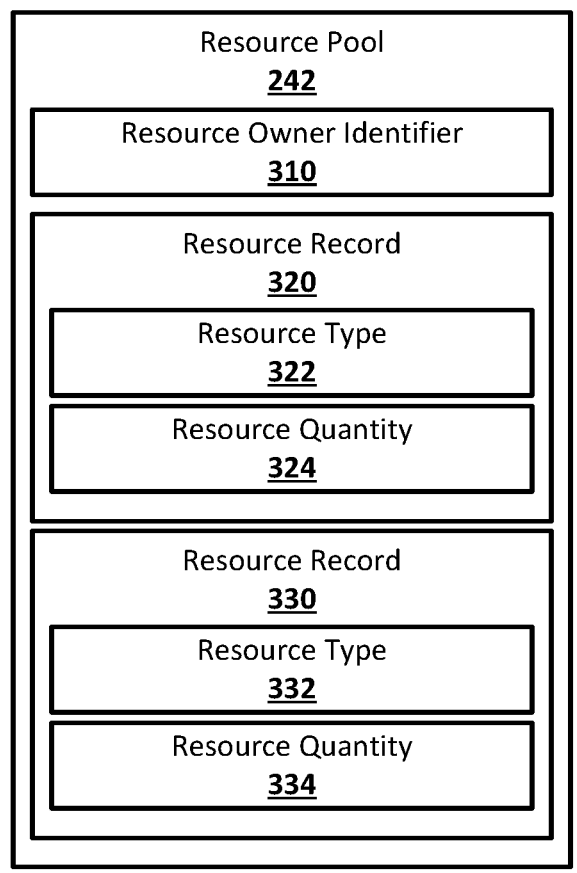
FIG. 3 shows an example system suitable for a resource distribution system according to an implementation of the disclosed subject matter.

FIG. 3 shows an example system suitable for a resource distribution system according to an implementation of the disclosed subject matter. The resource pool 242 on the resource tracking computing device 200 may include a resource owner identifier 310, and resource records 320 and 330. The resource owner identifier 310 may be any suitable identification of the party that controls the resources recorded in the resource pool 242. For example, the resource owner identifier may be a name of a person, organization, or user or process on a server system, an arbitrary name, a username and password combination, a passphrase or passcode, a unique number, or a cryptographic public key. The resource records 320 and 330 may include resource types 322 and 332, and resource quantities 324 and 334. The resource types 322 and 332 may indicate the type of resource that is recorded in the resource records 320 and 330. The resource types 322 and 332 may be any suitable resource, such as, for example, currency, cryptocurrency, commodities, financial instruments, or computational resources. The resource quantities 322 and 324 may indicate the quantity of the resource types 322 and 332 controlled by the party identified by the resource owner identifier 310 and tracked in the resource pool 242. The resource quantities 322 and 324 may be stored in, for example, registers or memory cells on the resource tracking computing device 200.

The resource tracking computing device 200 may track resources in any suitable manner. For example, the resource tracking computing device 200 may pool resources by type, with each resource pool, such as the resource pool 242, tracking a particular resource type, such as the resource type 322. The resource pool 242 may then include the resource quantity 324 of the resource type 322 controlled by each party that controls any amount of the resource type 322, using resource owner identifiers such as the resource owner identifier 310.

FIG. 4 shows an example arrangement suitable for a resource distribution system according to an implementation of the disclosed subject matter. A resource path in a resource transfer network may include routes that may start at any of a number of source resource tracking computing devices and end at any of a number of sink resource tracking computing devices. The resource transfer network may include routes with one leg for the resource path. Routes with one leg for a resource path may allow for a resource transfer starting at a source resource tracking computing device, such as the source resource tracking computing device 410 and ending at a sink resource tracking computing device, such as, for example, any of the sink resource tracking computing devices 420, 430, 440, and 450. The routes with one leg may go through resource tracking computing devices such as, for example, resource tracking computing devices 460, 470, 480, and 490. Different routes with one leg on the same resource path may go through different ones of the resource tracking computing devices 460, 470, 480, and 490, and the routes available for a particular resource transfer may depend on the desired sink resource tracking computing device. For example, if the sink resource tracking computing device 420 is the sink resource tracking computing device for a resource transfer, a route with one leg through the resource tracking computing device 460 may be available, but no other routes may be available. If the sink resource tracking computing device 440 is the sink resource tracking computing device for the resource transfer, routes with one leg through the resource tracking computing devices 470, 480, and 490 may be available, but no route through the resource tracking computing device 460 may available.

Figure 5A:
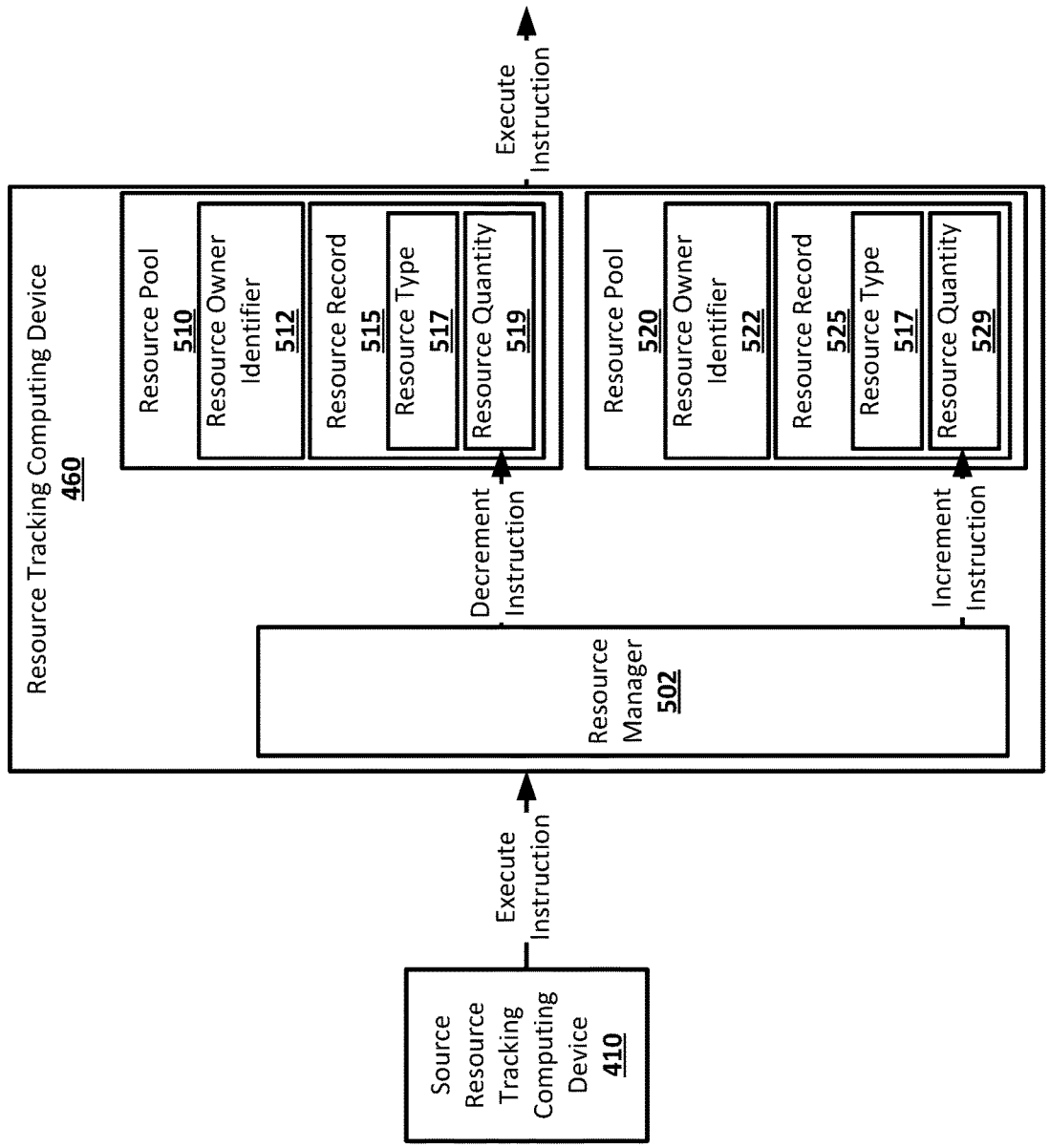
FIG. 5A shows an example system suitable for a resource distribution system according to an implementation of the disclosed subject matter.

FIG. 5A shows an example system suitable for a resource distribution system according to an implementation of the disclosed subject matter. A route with one leg may be used to execute a resource transfer. The source resource tracking computing device 410 may send an execute instruction to the resource tracking computing device 460. The resource tracking computing device 460 may include the resource pool 510, which may be controlled by a party indicated by the resource owner identifier 512. The party indicated by the resource owner identifier 512 may control the source resource tracking computing device 410. On receiving the execute instruction, the resource manager 502 may decrement resource quantity 519, which may lessen the quantity of resource type 517 recorded in resource record 515 as being in the resource pool 510. The resource type 517 may be, for example, the front resource type of the resource path for the resource transfer, and the starting resource type for one leg of the route being used. The resource manager 502 may increment resource quantity 529, which may increase the quantity of resource type 517 recorded in resource record 525 as being in resource pool 520. The resource pool 520 may be controlled by a party indicated by the resource owner identifier 522, which may be a different party than the party indicated by the resource owner identifier 512. The resource pool 520 may be the incoming resource pool for the leg. The amounts by which the resource quantity 519 is decremented and the resource quantity 529 is incremented may be equal, and may be specified, for example, by the execution instruction, or by a separately received message or instruction. In some implementations, the party indicated by the resource owner identifier 522 may control the resource tracking computing device 460.

Figure 5B:
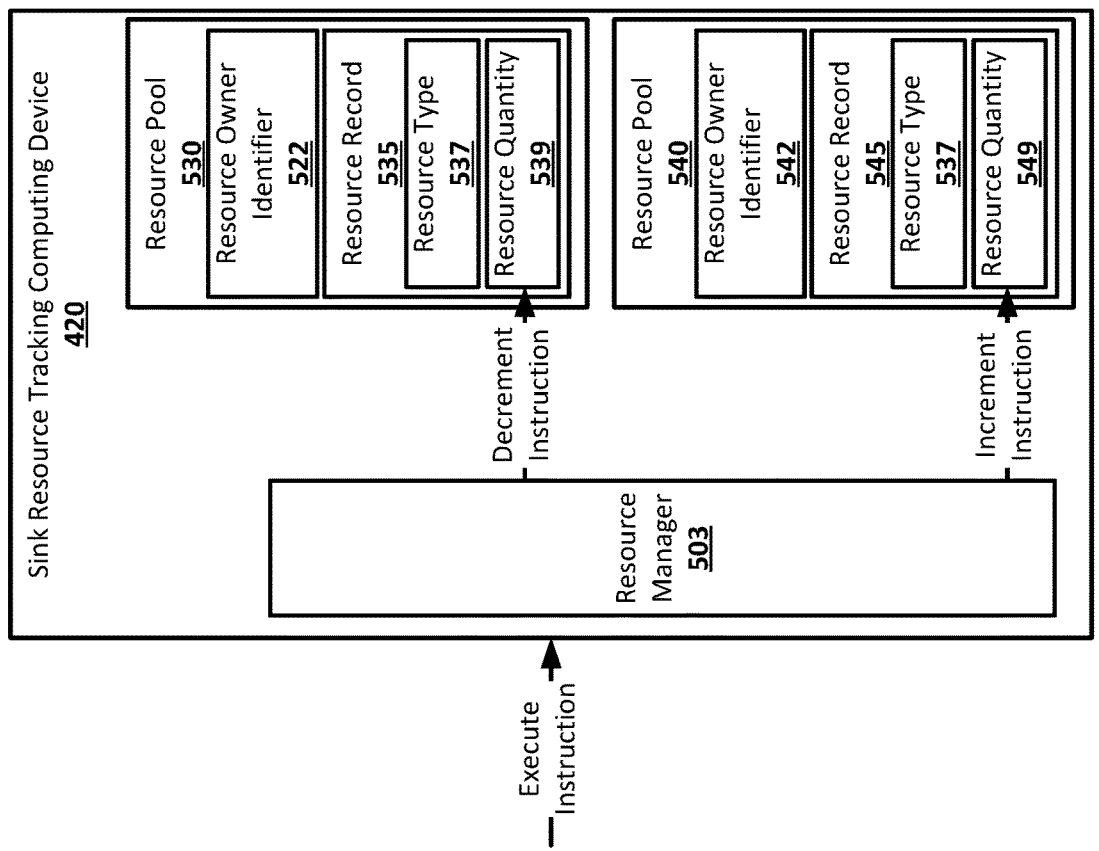
FIG. 5B shows an example system suitable for a resource distribution system according to an implementation of the disclosed subject matter.

FIG. 5B shows an example system suitable for a resource distribution system according to an implementation of the disclosed subject matter. The resource tracking computing device 460 may send an execute instruction to the sink resource tracking computing device 420. In some implementations, the execute instruction may be sent by another computing device that may be controlled by the party indicated by the resource owner identifier 522. The sink resource tracking computing device 420 may include the resource pool 530, which may be controlled by the party indicated by the resource owner identifier 522, and may be the outgoing resource pool for the leg. On receiving the execute instruction, the resource manager 503 may decrement resource quantity 539, which may lessen the quantity of resource type 537 recorded in resource record 535 as being in the resource pool 530. The resource type 537 may be the back resource type of the resource path for the resource transfer, and the ending resource type for one leg of the route being used. The resource manager 503 may increment resource quantity 549, which may increase the quantity of resource type 537 recorded in resource record 545 as being in resource pool 540. The resource pool 540 may be controlled by a party indicated by the resource owner identifier 542, which may be a different party than the parties indicated by the resource owner identifier 512 and 522, and may be a sink party for the resource transfer. The amounts by which the resource quantity 539 is decremented and the resource quantity 549 is incremented may be equal, and may be specified, for example, by the execution instruction, or by a separately received message or instruction. This may complete the one leg of the route used for the resource path, completing the resource transfer. The resource transfer may include a cost. The cost may be the difference between the quantity decremented from the resource quantity 519, and the quantity that would have been decremented from the resource quantity 519 if the resource pool 540 included a resource record for the resource type 517, allowing for the completion of a resource transfer without the resource pools 520 and 530.

Figure 6:
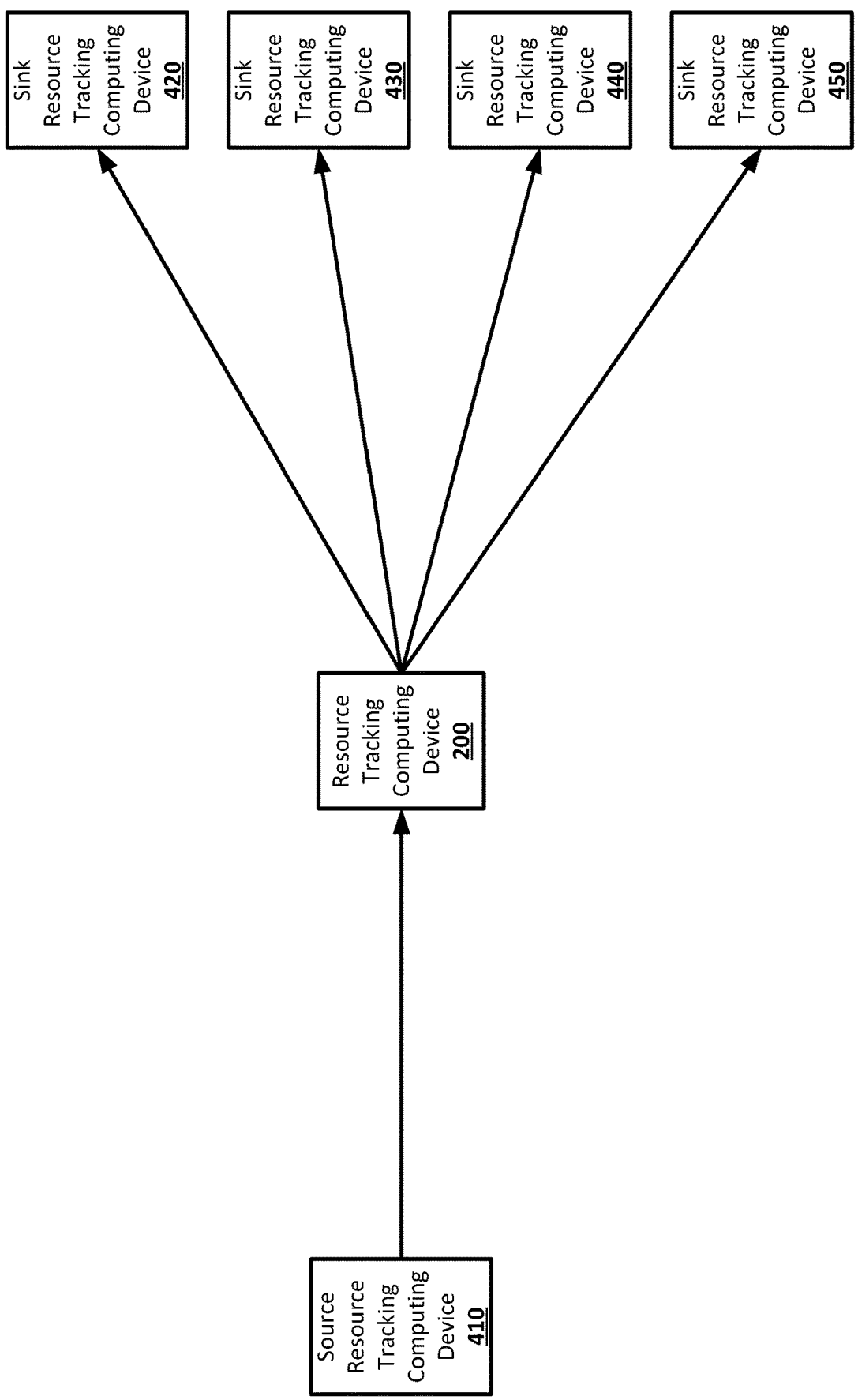
FIG. 6 shows an example arrangement suitable for a resource distribution system according to an implementation of the disclosed subject matter.

FIG. 6 shows an example arrangement suitable for a resource distribution system according to an implementation of the disclosed subject matter. A resource transfer network may include routes with two legs for a resource path. Routes with two legs for a resource path may allow for a resource transfer starting at a source resource tracking computing device, such as the source resource tracking computing device 510 and ending at a sink resource tracking computing device, such as, for example, any of the sink resource tracking computing devices 520, 530, 540, and 550. The routes with two legs may go through a resource tracking computing device such as, for example, resource tracking computing device 200. The resource tracking computing device 200 may make routes with two legs available between the source resource tracking computing device 510 and any of the sink resource tracking computing devices 520, 530, 540, and 550. The resource tracking computing device 200 may make such routes available for any number of resource paths, such that it may be possible to complete any resource transfer possible in the resource transfer network using a route with two legs through the resource tracking computing device 200.

FIG. 7A shows an example arrangement suitable for a resource distribution system according to an implementation of the disclosed subject matter. A route with two legs may be used to execute a resource transfer. The source resource tracking computing device 410 may include the resource pool 700, which may be controlled by the party indicated by the resource owner identifier 512. The party indicated by the resource owner identifier 512 may control the source resource tracking computing device 410. The resource manager 791, on instruction from source resource tracking computing device 410, may decrement resource quantity 519, which may lessen the quantity of resource type 517 recorded in resource record 705 as being in the resource pool 700. The resource type 517 may be the front resource type of the resource path for the resource transfer, and the starting resource type for first leg of the route being used. The resource manager 791 may increment resource quantity 719, which may increase the quantity of resource type 517 recorded in resource record 715 as being in resource pool 710, which may be the incoming resource pool for the first leg. The resource pool 710 may be controlled by a party indicated by the resource owner identifier 712, which may be a different party than the party indicated by the resource owner identifier 512. The amounts by which the resource quantity 519 is decremented and the resource quantity 719 is incremented may be equal, and may be specified, for example, by the execution instruction, or by a separately received message or instruction.

An execute instruction may be sent to the resource tracking computing device 200. The execute instruction may be sent by, for example, the source resource tracking computing device 410, or by another computing device, such as, for example, a computing device controlled by the part indicated by the resource owner identifier 712. The resource tracking computing device 200 may include the resource pool 720, which may be controlled by a party indicated by the resource owner identifier 712 and may be the outgoing resource pool for the first leg. On receiving the execute instruction, the resource manager 210 may decrement resource quantity 729, which may lessen the quantity of resource type 717 recorded in resource record 725 as being in the resource pool 720. The resource type 717 may be the intermediate resource type, the ending resource type for first leg of the route being used, and the starting resource type for the second leg of the route being used. The resource manager 210 may increment resource quantity 739, which may increase the quantity of resource type 717 recorded in resource record 735 as being in resource pool 730, which may be the incoming resource pool for the second leg. The resource pool 730 may be controlled by a party indicated by the resource owner identifier 732, which may be a different party than the parties indicated by the resource owner identifier 512 and 712. The amounts by which the resource quantity 729 is decremented and the resource quantity 739 is incremented may be equal, and may be specified, for example, by the execution instruction, or by a separately received message or instruction. This may complete the first leg of the route used for the resource path, and start the second leg of the route.

Figure 7B:
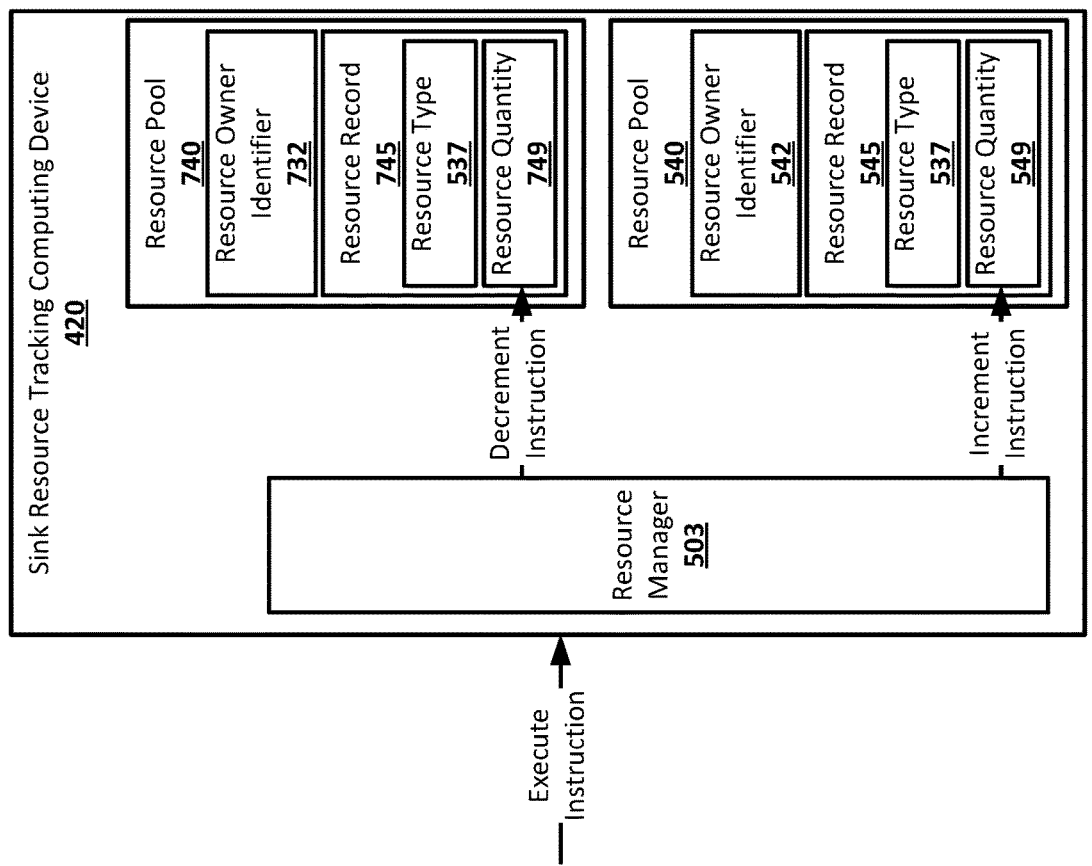
FIG. 7B shows an example arrangement suitable for a resource distribution system according to an implementation of the disclosed subject matter.

FIG. 7B shows an example arrangement suitable for a resource distribution system according to an implementation of the disclosed subject matter. The resource tracking computing device 200 may send an execute instruction to the sink resource tracking computing device 420. In some implementations, the execute instruction may be sent by another computing device that may be controlled by the party indicated by the resource owner identifier 732. The sink resource tracking computing device 420 may include the resource pool 740, which may be controlled by the party indicated by the resource owner identifier 732 and may be the outgoing resource pool for the second leg. On receiving the execute instruction, the resource manager 503 may decrement resource quantity 749, which may lessen the quantity of resource type 537 recorded in resource record 745 as being in the resource pool 740. The resource type 537 may be the back resource type of the resource path for the resource transfer, and the ending resource type for second leg of the route being used. The resource manager 503 may increment resource quantity 549, which may increase the quantity of resource type 537 recorded in resource record 545 as being in resource pool 540. The resource pool 540 may be controlled by a party indicated by the resource owner identifier 542, which may be a different party than the parties indicated by the resource owner identifier 512, 712, and 732, and may be a sink party for the resource transfer. The amounts by which the resource quantity 749 is decremented and the resource quantity 549 is incremented may be equal, and may be specified, for example, by the execution instruction, or by a separately received message or instruction. This may complete the second leg of the route used for the resource path, completing the resource transfer. The resource transfer may include a cost. The cost may be the difference between the quantity decremented from the resource quantity 519, and the quantity that would have been decremented from the resource quantity 519 if the resource pool 540 included a resource record for the resource type 517, allowing for the completion of a resource transfer without the resource pools 710, 720, 730, and 740. Each leg of the route may be responsible for any portion of the cost of the resource transfer.

Figure 7C:
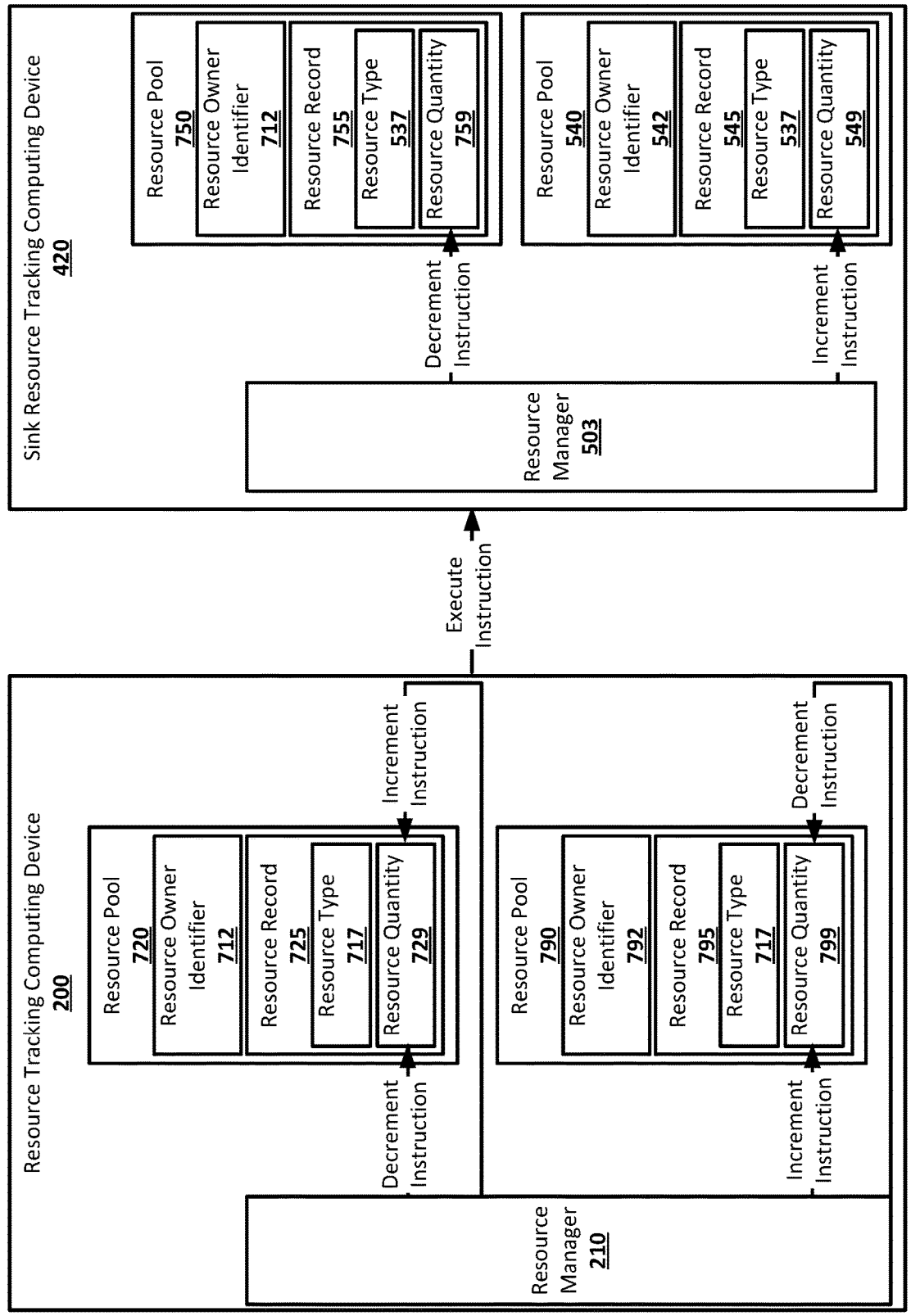
FIG. 7C shows an example arrangement suitable for a resource distribution system according to an implementation of the disclosed subject matter.

FIG. 7C shows an example arrangement suitable for a resource distribution system according to an implementation of the disclosed subject matter. In some implementations, the sink resource tracking computing device 420 may include a resource pool 750, which may be controlled by the party indicated by the resource owner identifier 712. After the execute instruction is sent to the resource tracking computing device 200, the resource manager 210 may decrement the resource quantity 729, which may lessen the quantity of the resource type 717 recorded in the resource record 725 as being in the resource pool 720, and may increment resource quantity 799, which may increase the quantity of resource type 717 recorded in resource record 795 as being in resource pool 790. The resource pool 790 may be controlled by a party indicated by the resource owner identifier 792, which may be a different party than the parties indicated by the resource owner identifier 512 and 712, and may be the party that controls the resource tracking computing 200. The amounts by which the resource quantity 729 is decremented and the resource quantity 799 is incremented may be equal, and may be specified, for example, by the execution instruction, or by a separately received message or instruction. The resource manager 210 may then, after any suitable period of time, decrement the resource quantity 799 by the same quantity by which it was incremented, and may increment the resource quantity 729 by the same quantity by which it was decremented. This may complete the first leg of the route used for the resource path, and start the second leg of the route.

The resource tracking computing device 200 may send an execute instruction to the sink resource tracking computing device 420. On receiving the execute instruction, the resource manager 503 may decrement resource quantity 759, which may lessen the quantity of resource type 537 recorded in resource record 755 as being in the resource pool 750, which may be controlled by the party indicated by the resource owner identifier 712. The resource manager 503 may increment resource quantity 549, which may increase the quantity of resource type 537 recorded in resource record 545 as being in resource pool 540. The resource pool 540 may be controlled by a party indicated by the resource owner identifier 542, which may be a different party than the parties indicated by the resource owner identifier 512, 712, and 792, and may be a sink party for the resource transfer. The amounts by which the resource quantity 759 is decremented and the resource quantity 549 is incremented may be equal, and may be specified, for example, by the execution instruction, or by a separately received message or instruction. This may complete the second leg of the route used for the resource path, completing the resource transfer.

Figure 8:
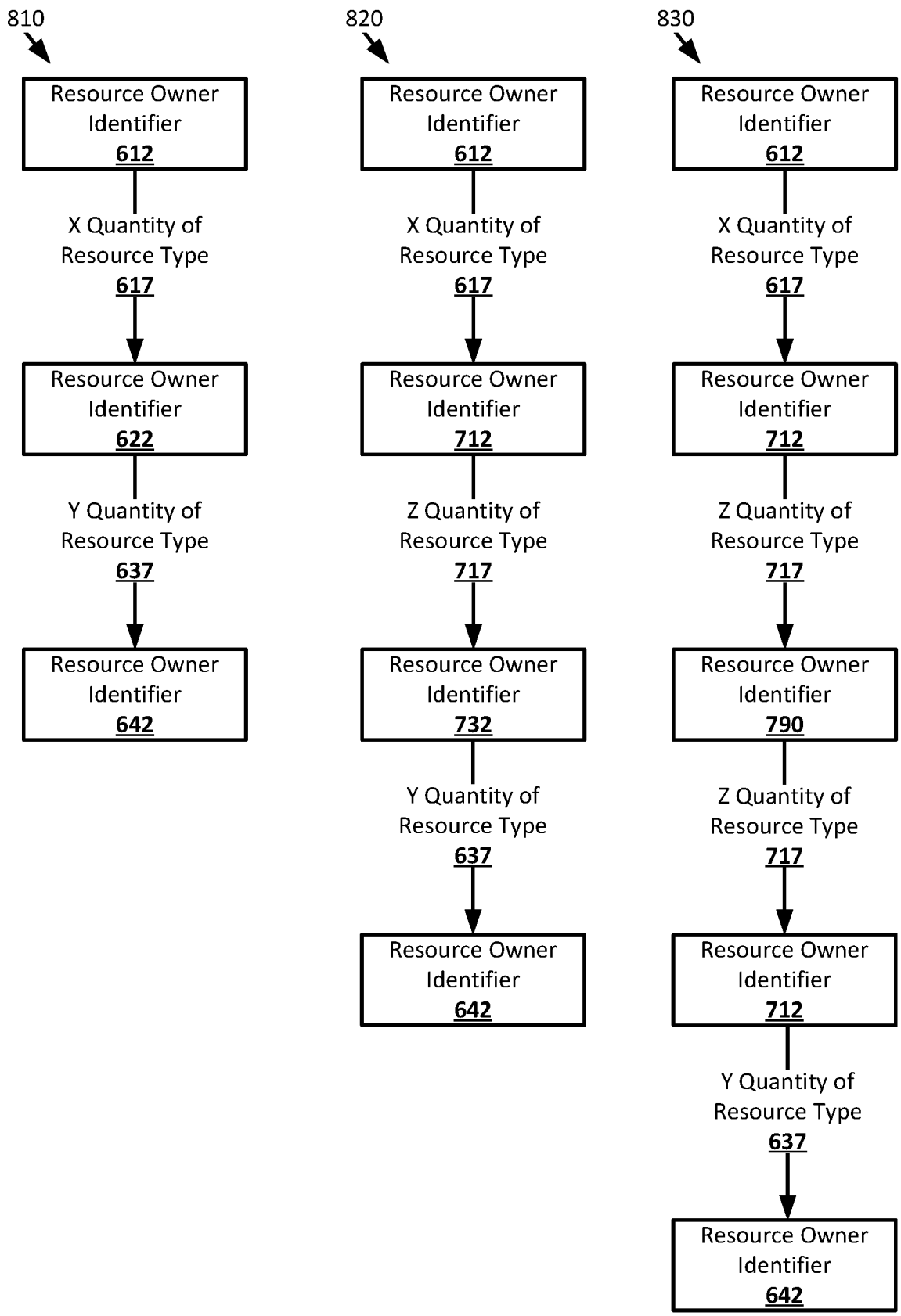
FIG. 8 shows an example system suitable for a resource distribution system according to an implementation of the disclosed subject matter.

FIG. 8 shows an example system suitable for a resource distribution system according to an implementation of the disclosed subject matter. Route 810 may include one leg. X quantity of the resource type 617 may be transferred out of a resource pool controlled by the party indicated by the resource owner identifier 612 and into a resource pool controlled by the party indicated by the resource owner identifier 622. This may occur, for example, on a resource tracking computing device such as the resource tracking computing device 460. Y quantity of the resource type 637 may be transferred out of a resource pool controlled by the party indicated by the resource owner identifier 622 and into a resource pool controlled by the party indicated by the resource owner identifier 642, completing the resource transfer. This may occur, for example, on a resource tracking computing device such as the sink resource tracking computing device 520.

Route 820 may include two legs. X quantity of the resource type 617 may be transferred out of a resource pool controlled by the party indicated by the resource owner identifier 612 and into a resource pool controlled by the party indicated by the resource owner identifier 622. This may occur, for example, on a resource tracking computing device such as the source resource tracking computing device 410. Z quantity of the resource type 717 may be transferred out of a resource pool controlled by the party indicated by the resource owner identifier 712 and into a resource pool controlled by the party indicated by the resource owner identifier 732, completing the first leg of the route and starting the second leg of the route. This may occur, for example, on a resource tracking computing device such as the resource tracking computing device 200. Y quantity of the resource type 637 may be transferred out of a resource pool controlled by the party indicated by the resource owner identifier 732 and into a resource pool controlled by the party indicated by the resource owner identifier 642, completing the second leg of the route, and completing the resource transfer. This may occur, for example, on a resource tracking computing device such as the sink resource tracking computing device 520.

Route 830 may include two legs. X quantity of the resource type 617 may be transferred out of a resource pool controlled by the party indicated by the resource owner identifier 612 and into a resource pool controlled by the party indicated by the resource owner identifier 622. This may occur, for example, on a resource tracking computing device such as the source resource tracking computing device 410. Z quantity of the resource type 717 may be transferred out of a resource pool controlled by the party indicated by the resource owner identifier 712 and into a resource pool controlled by the party indicated by the resource owner identifier 790. Z quantity of the resource type 717 may then be transferred out of the resource pool controlled by the part indicated by the resource owner identifier 790 back into the resource pool controlled by party indicated by the resource owner identifier 712, completing the first leg of the route and starting the second leg of the route. This may occur, for example, on a resource tracking computing device such as the resource tracking computing device 200. Y quantity of the resource type 637 may be transferred out of a resource pool controlled by the party indicated by the resource owner identifier 712 and into a resource pool controlled by the party indicated by the resource owner identifier 642, completing the second leg of the route, and completing the resource transfer. This may occur, for example, on a resource tracking computing device such as the sink resource tracking computing device 520.

Figure 9:
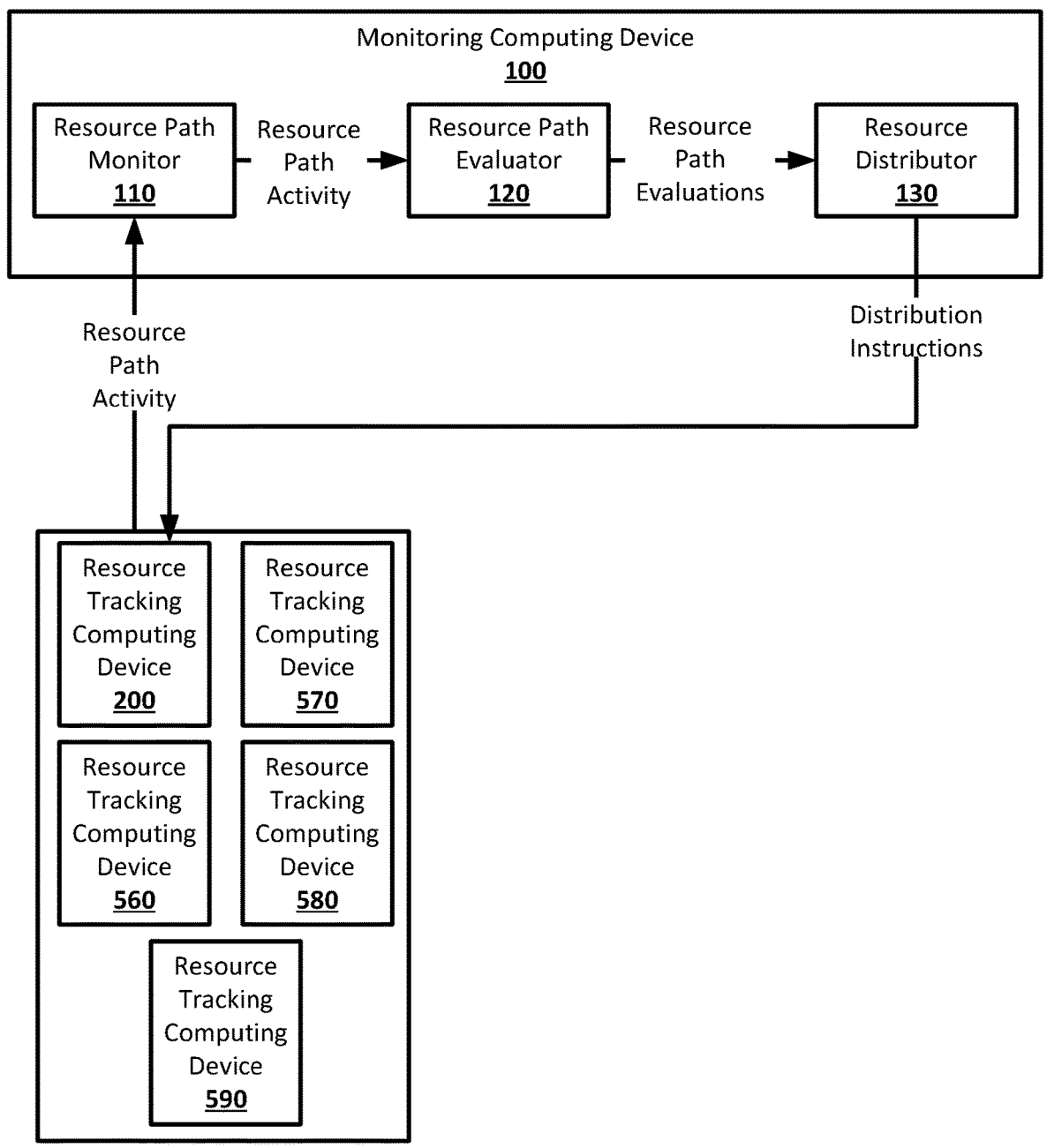
FIG. 9 shows an example arrangement suitable for a resource distribution system according to an implementation of the disclosed subject matter.

FIG. 9 shows an example arrangement suitable for a resource distribution system according to an implementation of the disclosed subject matter. The activity of various resource tracking computing devices in a resource transfer network may be monitored by the monitoring computing device 100. For example, the monitoring computing device 100 may monitor any resource tracking computing device, such as the resource tracking computing devices 200, 560, 570, 580, and 590, which are not a source or sink resource tracking computing device in the resource transfer network. The resource path monitor 110 may monitor resource path activity for selected resource paths in the resource transfer network. The monitored activity may be, for example, the advertised volumes and costs of the legs made available by resource pools on the various monitored resource tracking computing devices that may be used to form routes for the resource paths being monitored, or the actual transferred amounts of resources across selected resource paths. For example, the advertised volumes and costs of legs may be broadcast or otherwise made available publicly, for example being stored in a shared memory space or network accessible memory space, by the resource tracking computing devices 200, 560, 570, 580, and 590.

The resource path monitor 110 may monitor activity of the resource transfer network over any suitable period of time, such as, for example, over a monitoring period. The monitoring period may be any suitable amount of time that may be less than or equal to a distribution period. At the end of a monitoring period, the resource path activity as determined by the resource path monitor 110 may be sent to the resource path evaluator 120. The resource path evaluator 120 may evaluate the resource path activity of the selected resource paths that were monitored by the resource path monitor 110. The resource path evaluator 120 may, for example, determine the total volume of an intermediate resource type, such as the resource type 717, that could have been transferred through each of the resource pools on the resource tracking computing device 200 associated with a leg used to form a route for one of the selected resource paths, excluding the volume of any routes with a cost higher than a threshold, or backstop, cost for that resource path. The threshold or backstop cost for a resource path may be the cost of a route for the resource path that uses only one leg, such as the route 810. The resource path evaluator 120 may be able to determine net transfer amounts for the front and back resource types of the resource paths in the resource transfer network. The resource path evaluator 120 may use the actual amount of transferred resources across a selected resource path, as determined by the resource path monitor 110, to determine net transfer amounts. The resource path evaluator 120 may also determine, for example, when a route for a resource path in the resource transfer network with a higher cost than the threshold, or backstop, cost for that resource path was used in a resource transfer, or when are legs associated with resource pools on the resource tracking computing device 200 do not get used as part of a route for any resource transfer that takes place during the distribution period.

The resource distributor 130 may receive resource path evaluations from the resource path evaluator 120, including, for example, any suitable combination of total volumes of the resource type 717 that could have been transferred through each of the resource pools on the resource tracking computing device 200 associated with a leg used to form a route for one of the selected resource paths, excluding the volume of any such routes with costs higher than some threshold, or backstop, cost, and net transfer amounts for the selected resource paths. The resource distributor 130 may use the net transfer amounts to determine a reservoir resource quantity for the resource transfer network, for example, before the end of the first distribution period. The resource distributor 130 may assign a percentage of the reservoir resource quantity to each of the selected resource paths in any suitable manner. The resource distributor 130 may use the total volumes of the resource type 717 that could have been transferred through each of the resource pools on the resource tracking computing device 200 to determine the portion of the reservoir resource quantity that may distributed to each of these resource pools at the end of each distribution period. The resource distributor 130 may effect the distribution of the portions of the reservoir resource quantity to the resource pools on the resource tracking computing device 200, for example, sending distribution instructions, which may include execute instructions, to the resource tracking computing device 200. The resource distributor may also determine adjustments to the reservoir resource quantity based on whether the resource path evaluator 120 determined that a route for a resource path in the resource transfer network with a higher cost than the threshold, or backstop, cost for that resource path was used in a resource transfer, or that there are legs associated with resource pools on the resource tracking computing device 200 that did not get used as part of a route for any resource transfer that took place during the distribution period.

Figure 10:
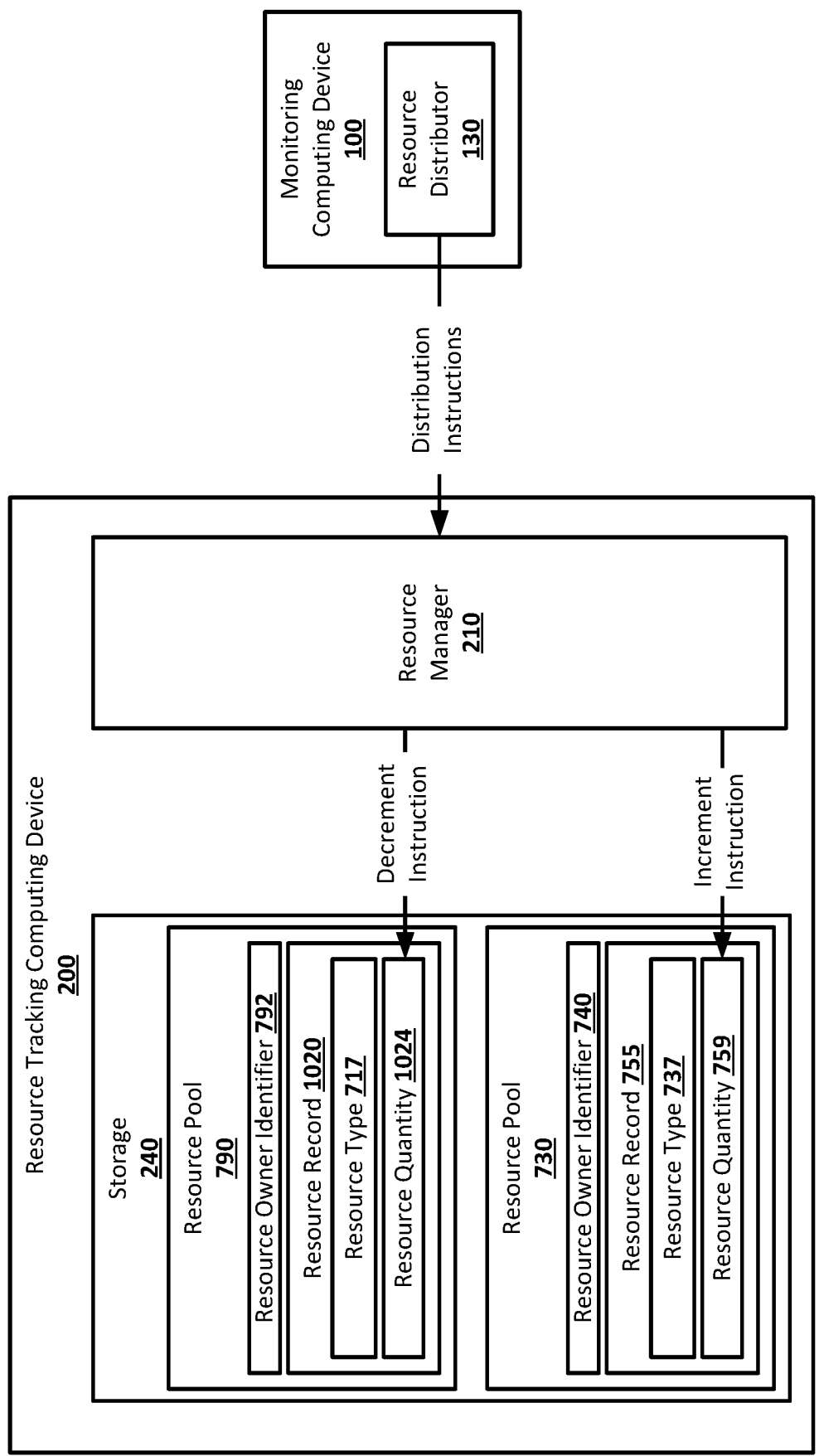
FIG. 10 shows an example arrangement suitable for a resource distribution system according to an implementation of the disclosed subject matter.

FIG. 10 shows an example arrangement suitable for a resource distribution system according to an implementation of the disclosed subject matter. The distribution instructions from the resource distributor 130 may be sent to the resource manager 210 of the resource tracking computing device 200. The distribution instructions may include any suitable number of execute instructions for transfers from the resource pool 790 to other resource pools, such as the resource pool 730, on the resource tracking computing device 200. The resource pool 790 may be the repository resource pool. The resource pool 790 may include the resource record 1020, which may include a record of the resource quantity 1024 for the resource type 717, from which the reservoir resource quantity may be taken. For example, the distribution instructions may indicate that some portion of the reservoir resource quantity should be transferred to the resource pool 730. The resource quantity 1024 may be decremented, and the resource quantity 759, by the appropriate amount. The resource quantity 1024 may be further decremented to transfer other portions of the reservoir resource quantity to other resource pools on the resource tracking computing device 200 in accordance with the distribution instructions.

Figure 11:
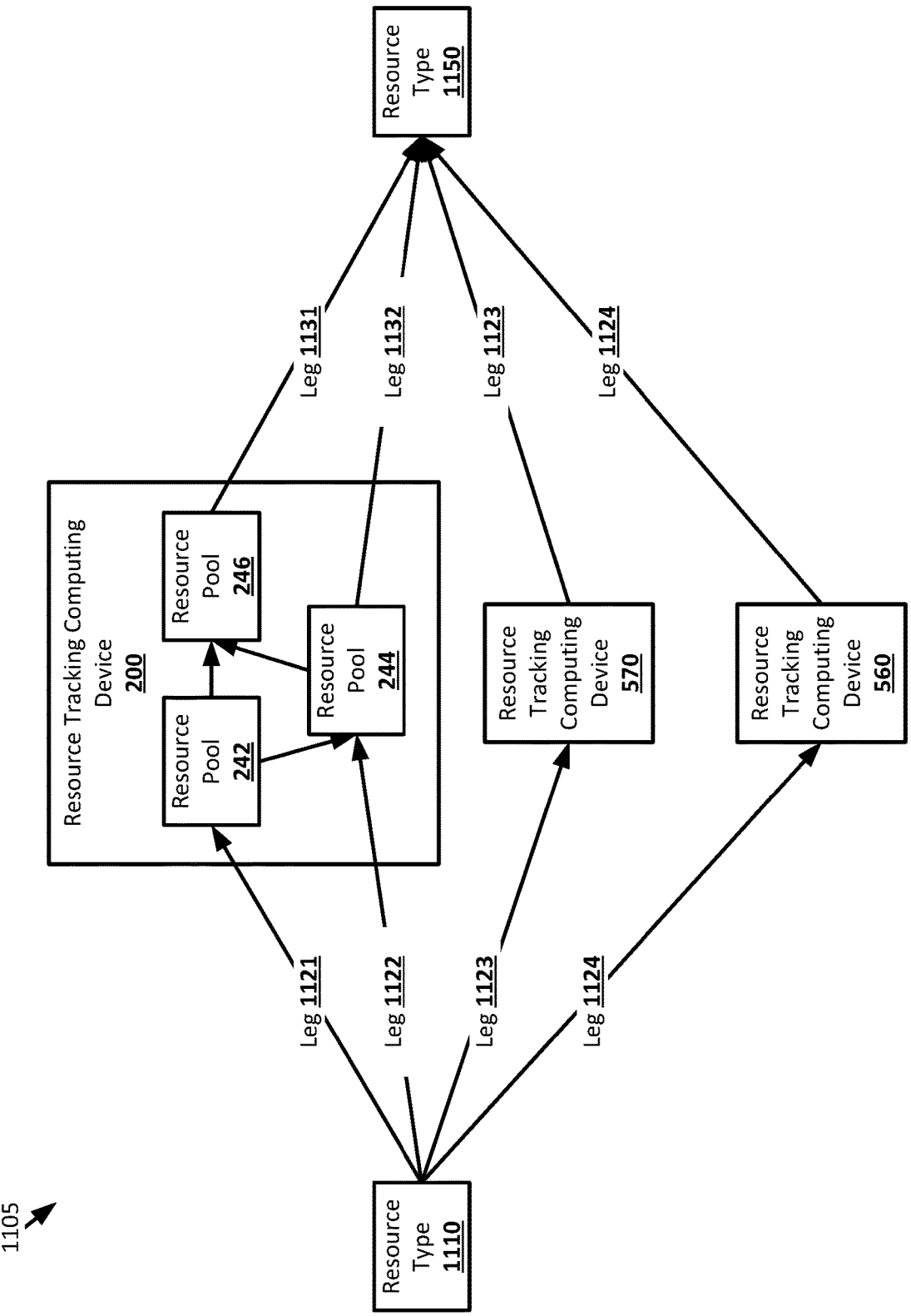
FIG. 11 shows an example arrangement suitable for a resource distribution system according to an implementation of the disclosed subject matter.

FIG. 11 shows an example arrangement suitable for a resource distribution system according to an implementation of the disclosed subject matter. A first half of a resource path 1105 in a resource transfer network may allow for a resource transfer that starts with the resource type 1110 and ends with the resource type 1150. Routes with two legs may go through the resource tracking computing device 200, and any of the resource pools 242, 244, and 246. For example, leg 1121 may start with the resource type 1110 being transferred out of a resource pool controlled by a source party and end with an intermediate resource type, such as the resource type 717, being transferred out of the resource pool 242 and into either the resource pool 244 or 246. The leg 1121 may be associated with the resource pool 242. Leg 1131 may start with the intermediate resource type being transferred into the resource pool 246, and end with the resource type 1150 being transferred to a resource pool controlled by a sink party. The leg 1131 may be associated with the resource pool 246. Leg 1122 may start with the resource type 1110 being transferred out of a resource pool controlled by a source party and end with an intermediate resource type, such as the resource type 717, being transferred out of the resource pool 244. The leg 1122 may be associated with the resource pool 244. Leg 1132 may start with the intermediate resource type being transferred into the resource pool 244, and end with the resource type 1150 being transferred to a resource pool controlled by a sink party. The leg 1132 may be associated with the resource pool 244. Leg 1123 may start with resource type 1110 being transferred out of a resource pool controlled by a source party into a resource pool on the resource tracking computing device 570, and end with the resource type 1150 being transferred into a resource pool controlled by a sink party. The leg 1123 may be associated with the resource pool on the resource tracking computing device 570. Leg 1124 may start with resource type 1110 being transferred out of a resource pool controlled by a source party into a resource pool on the resource tracking computing device 560, and end with the resource type 1150 being transferred into a resource pool controlled by a sink party. The leg 1124 may be associated with the resource pool on the resource tracking computing device 560. The leg 1121, 1122, 1123, 1124, 1131, and 1132 may be used to form routes for the first half of the resource path 1105. For example, the leg 1121 may form a route with the leg 1131 or the leg 1132. The leg 1122 may form a route with the leg 1131 or the leg 1132. The leg 1123 may be a one-leg route, and the leg 1124 may be one-leg route.

Each of the legs 1121, 1122, 1123, 1124, and 1125 may have its volume and cost advertised. The resource pools 242, 244, and 246, and the resource pools on the resource tracking computing devices 560 and 570, may each be associated with additional legs that may be used to form routes for the resource path 1105. The additional legs may have their own volumes and costs. For example the leg 1121 may be advertised with a first volume of the intermediate resource that may be transferred out of the resource pool 242, along with an associated first cost. The resource pool 242 may be associated with another leg, which may also begin with the resource type 1110 and end with the intermediate resource type, which may be advertised with a second volume and a second cost, which may differ from the first volume and the first cost. The resource pools 242, 244, and 246, and the resource pools on the resource tracking computing devices 560 and 570, may also be associated with legs that may be used to form routes for the second half of the resource path 1105, which may begin with the resource type 1150 and end with the resource type 1110. Portions of the reservoir resource quantity may be distributed to the resource pools 242, 244, and 246, based, for example, on the advertised volumes and costs of the legs 1121, 1122, 1123, and 1124, and any other advertised legs associated with the resource pools 242, 244, and 246 that be used to form routes for the resource path 1105.

Figure 12:
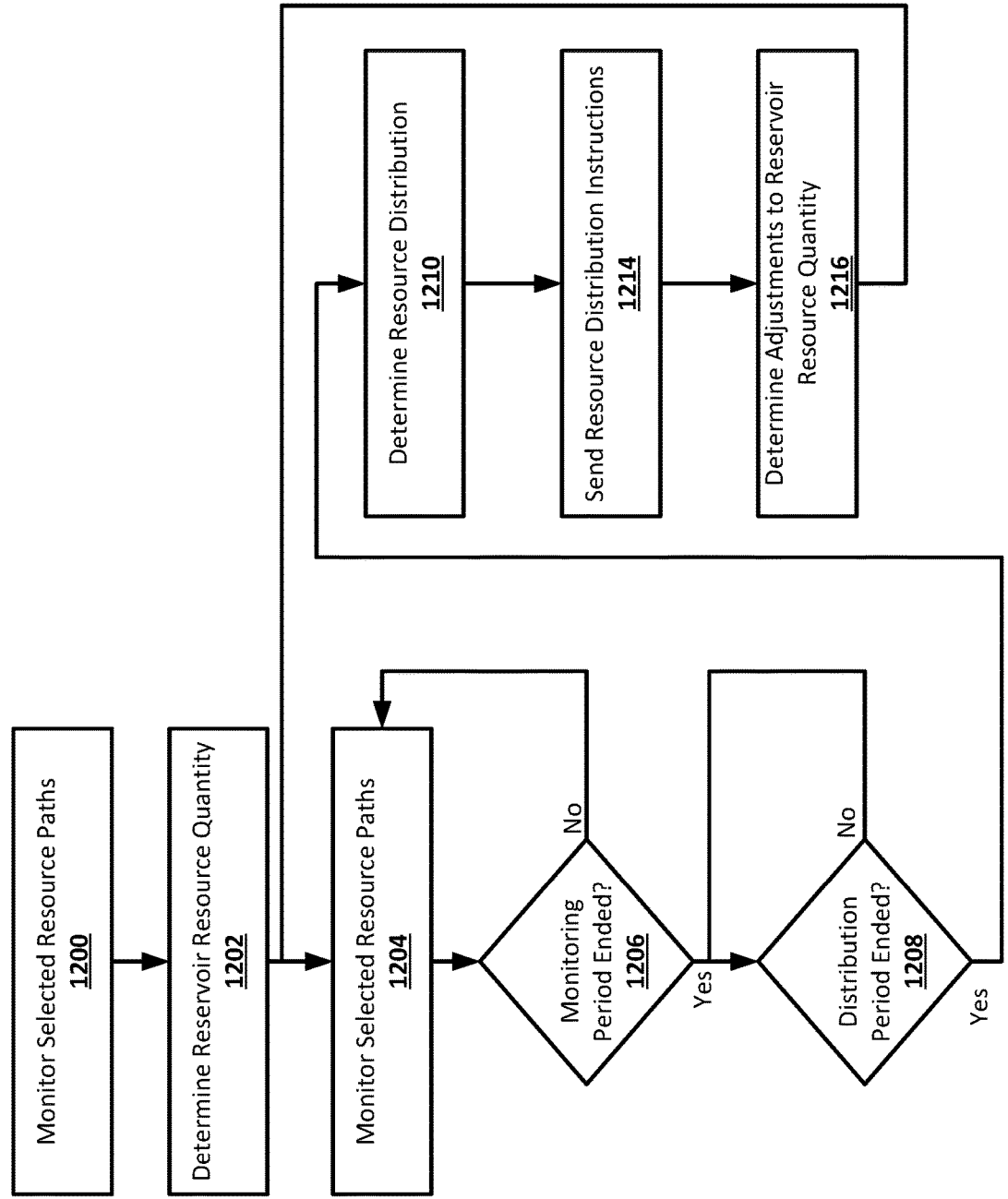
FIG. 12 shows an example procedure suitable for a resource distribution system according to an implementation of the disclosed subject matter.

FIG. 12 shows an example procedure suitable for a resource distribution system according to an implementation of the disclosed subject matter. At 1200, selected resource paths may be monitored. For example, the monitoring computing device 100 may monitor selected resource paths in a resource transfer network. The monitoring computing device 100 may monitor activity of the selected resource paths, including quantities of front and back resources transferred into and out of resource pools during resource transfers across the selected resource paths. The monitoring computing device 100 may monitor the selected resource paths for any suitable period of time.

At 1202, a reservoir resource quantity may be determined. For example, the monitoring computing device 100 may determine a reservoir resource quantity in any suitable manner based on the monitoring of the activity of the selected resource paths in the resource transfer network. The monitoring computing device 100 may, for example, determine net transfer amounts for each front and back resource type for each selected resource path, convert the net transfer amounts for each front and back resource type into an amount of an intermediate resource type, and sum the converted amounts to determine the reservoir resource quantity.

At 1204, selected resource paths may be monitored. For example, the monitoring computing device 100 may monitor the same selected resource paths in the resource transfer network that were monitored to determine the reservoir resource quantity. This may start a monitoring period, which may coincide with the start of a distribution period, or may take place any suitable amount of time after a distribution period has started. The monitoring computing device 100 may monitor the various advertised legs that may be used to form routes for the selected resource paths, including the costs and volumes of legs associated with resource pools on an intermediate resource type tracking system, such as the resource tracking computing device 200, and resource transfers that take place using legs associated with these resource pools. The monitoring computing device 100 may also monitor activity on routes for the selected resource paths that use only one leg, for example, going through resource pools on resource tracking computing devices other than resource tracking computing device 200, and the costs of any such routes used for a resource transfer during the monitoring period.

At 1206, whether the monitoring period has ended may be determined. For example, if an appropriate amount of time has elapsed since the start of the monitoring period, the monitoring period may be ended, and flow may proceed to 1208. Otherwise flow may proceed back to 1204, where monitoring of the selected resource paths may continue.

At 1208, whether the distribution period has ended may be determined. For example, if an appropriate amount of time has elapsed since the start of the distribution period, the distribution period may be ended, and flow may proceed to 1210. Otherwise, flow may proceed to 1208 until the distribution period ends.

At 1210, a resource distribution may be determined. For example, the monitoring computing device 100 may determine the portions of the reservoir resource quantity to distribute from a repository resource pool to other resource pools on the resource tracking computing device 200. The portion distributed to a resource pool on the resource tracking computing device 200 may be based on, for example, the selected resource paths for which legs associated with the resource pool could be used to form routes. For each selected resource path, the volumes of the advertised leg associated with the resource pool that could be used to form a route with a cost below a threshold cost may be totaled, and the total may be divided the total volume of the legs associated with all resource pools on the resource tracking computing device 200 that could be used to form a route for the same selected resource path. This percentage may then be multiplied by the portion of the reservoir resource quantity assigned to the selected resource path to determine the amount of the reservoir resource quantity that will be transferred to the resource pool based on the resource pool's associated legs for the selected resource path. This may be repeated for each resource pool on the resource tracking computing device 200, and each selected resource path, to determine distribution instructions. A resource pool associated with legs that could be used to form below-threshold cost routes for multiple resource paths may receive some portion of the reservoir resource quantity based on each of the multiple resource paths. For example, a resource pool may be associated with one leg that may be used to form routes for two selected resource paths, or may be associated with two legs, each of which may be used to form a route for a different resource path.

At 1214, distribution instructions may be sent. For example, the monitoring computing device 100 may send distribution instructions to the resource tracking computing device 200. The distribution instructions may include execute instructions, which may cause the resource manager 210 to decrement the quantity of an intermediate resource type recorded by a repository resource pool, for example, the resource pool 790, by some quantity, which may be equal to the reservoir resource quantity, and to increment the quantity of the intermediate resource type recorded by various resource pools on the resource tracking computing device 200, such as the resource pools 242, 244, 246, 248, 720, and 730, by their determined portion of the reservoir resource quantity. This may effect distribution of the reservoir resource quantity from the repository resource pool to the resource pools which were associated with legs that could be sued to form routes with below threshold costs for the selected resource paths.

At 1216, the reservoir resource quantity may be adjusted. For example, the monitoring computing device 100 may determine that, during the monitoring period, a resource transfer occurred on one of the selected resource paths using a route with one leg and having a cost higher than a threshold, or backstop, cost, for that resource path. The monitoring computing device 100 may increase the reservoir resource quantity, for example, based on the percentage by which the current total volume for all legs available for the selected resource path exceeds the net intermediate resource type amount for the resource path from the previous distribution period. The monitoring computing device 100 may determine that, during the monitoring period, a resource pool on the resource tracking computing device 200 was associated with a leg that was not used to form a route for any resource transfer. The monitoring computing device 100 may decrease the reservoir resource quantity, for example, based on the percentage by which the net intermediate resource type amount for the resource path from the previous distribution period exceeds the current total volume of all legs in the resource path that form routes with a cost less than the backstop cost.

Figure 13:
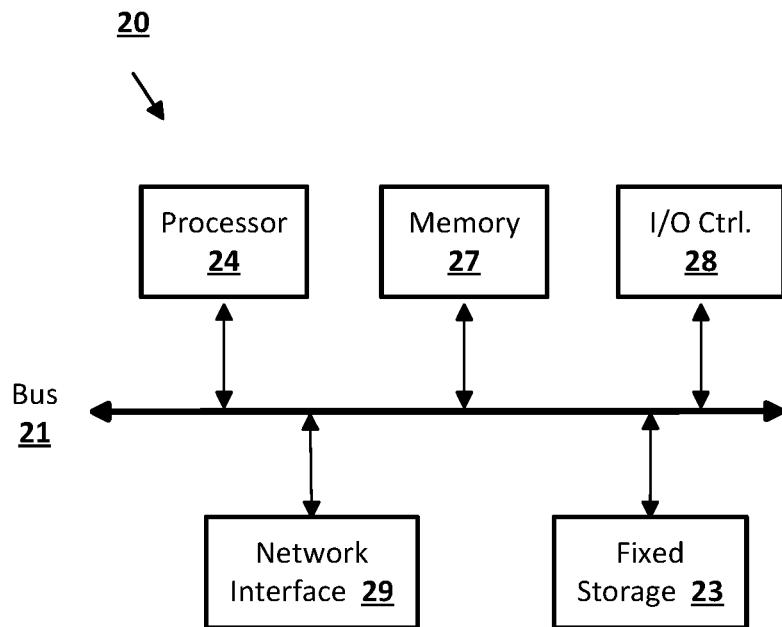
FIG. 13 shows a computer according to an embodiment of the disclosed subject matter.

Implementations of the presently disclosed subject matter may be implemented in and used with a variety of component and network architectures. FIG. 13 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 14.

Many other devices or components (not shown) may be connected in a similar manner (e.g., document scanners, digital cameras and so on). Conversely, all of the components shown in FIG. 13 need not be present to practice the present disclosure. The components can be interconnected in different ways from that shown. The operation of a computer such as that shown in FIG. 13 is readily known in the art and is not discussed in detail in this application. Code to implement the present disclosure can be stored in computer-readable storage media such as one or more of the memory 27, fixed storage 23, removable media 25, or on a remote storage location.

Figure 14:
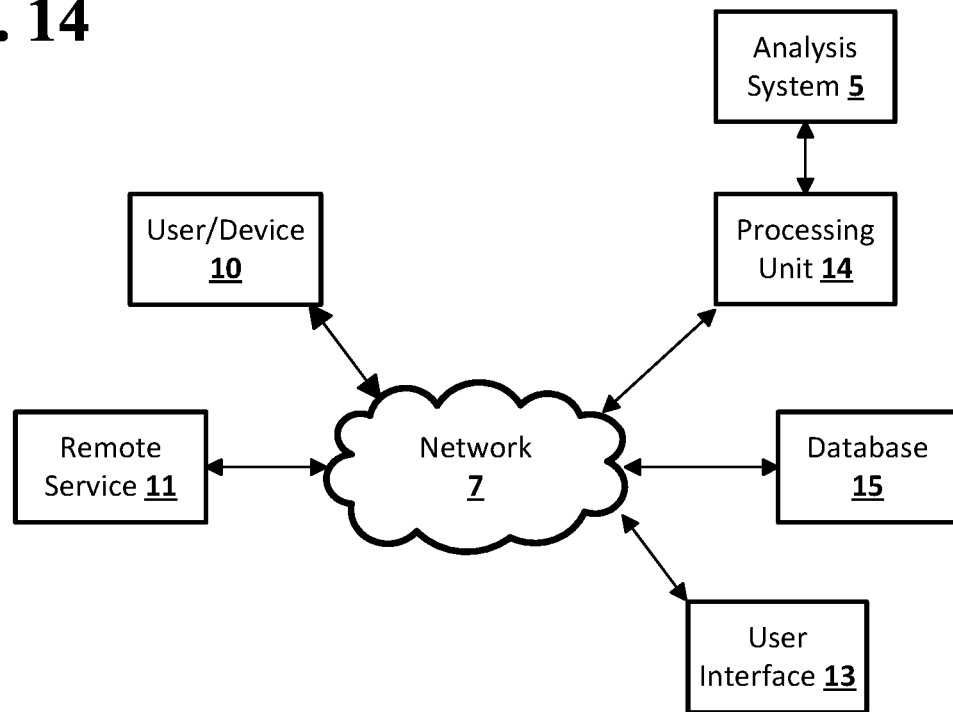
FIG. 14 shows a network configuration according to an embodiment of the disclosed subject matter.

FIG. 14 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method performed on a data processing apparatus comprising:
   receiving an indication of an available leg for a resource path, the resource path comprising a front resource type and a back resource type, the available leg associated with a resource pool comprising a register indicating a quantity of an intermediate resource type, wherein the available leg can be used to form a route for half of the resource path;
   determining from the indication of the available leg a total quantity of an intermediate resource type transferrable either out of or into the resource pool associated with the leg based on monitoring of the resource path over a monitoring period which occurs during a distribution period;
   determining a quantity of the intermediate resource type to be transferred into the resource pool associated with the leg based on the total quantity of the intermediate resource type transferrable either out of or into resource pool associated with the leg; and
   generating and causing to be executed, at the end of the distribution period, instructions decrementing a register in a repository resource pool by the determined quantity of the intermediate resource type to be transferred into the resource pool associated with the leg and incrementing the register in the resource pool associated with the leg by the determined quantity of the intermediate resource type to be transferred into the resource pool associated with the leg.

2. The method of claim 1, wherein the indication of the available leg further comprises a cost of the available leg.

3. The method of claim 2, wherein a route for the resource path comprises the available leg and another leg, the route comprising a cost that is the sum of the cost of the available leg and the cost of the another leg.

4. The method of claim 3, wherein the total quantity of the intermediate resource type transferrable either out of or into the resource pool associated with the leg when the leg is used for the resource path comprises the sum of the quantities of the intermediate resource type transferrable either out of or into the resource pool associated with the leg when the leg is part of a route for half of the resource path and the cost of the route is less than a threshold cost for the half of the resource path.

5. The method of claim 4, wherein the threshold cost for the resource path comprises a cost of a one-leg route for the half of the resource path.

6. The method of claim 1, wherein the quantity of the intermediate resource type to be transferred into the resource pool associated with the leg is further based on a portion of a reservoir resource quantity assigned to the resource path.

7. A computer-implemented method performed on a data processing apparatus comprising:
   monitoring a plurality of selected resource paths in a resource transfer network;
   determining a quantity of an intermediate resource type to transfer into each of a plurality of resource pools in the resource transfer network, each of the plurality of resource pools associated with at least one leg that can be part of a route with two legs for at least one of the selected resource paths; and
   generating and causing to be executed instructions decrementing a register in a repository resource pool by the determined quantities of the intermediate resource type to be transferred into the plurality of resource pools in the resource transfer network and incrementing a register in each of the plurality of resource pools in the resource transfer network by the determined quantity of the intermediate resource type to be transferred into that resource pool when the determined quantity is greater than zero;
   wherein the determined quantities of the intermediate resource type to be transferred into the plurality of resource pools in the resource transfer network are further based on portions of a reservoir resource quantity assigned to the plurality of selected resource paths.

8. The method of claim 7, further comprising:
   monitoring a plurality of resource transfers on selected resource paths in the resource transfer network;
   determining a net intermediate resource type quantity for each of the selected resource paths; and
   determining a reservoir resource quantity based on the net intermediate resource type quantity for each of the selected resource paths.

9. The method of claim 8, wherein determining a net intermediate resource type quantity for a selected resource path comprises:
   determining a first result by reducing a total quantity of a front resource type that is transferred in at the start of a first half of the selected resource path by a total quantity of the front resource type that is transferred out at the end of a second half of the selected resource path;
   setting a first net transfer amount to the absolute value of the first result when the first result is less than zero or setting the first net transfer amount to zero when the first result is not less than zero;
   determining a second result by reducing a total quantity of a back resource type transferred in at the start of the second half of the selected resource path by a total quantity of the back resource type that is transferred out at the end of the first half of the selected resource path;
   setting a second net transfer amount to the absolute value of the second result when the second result is less than zero or setting the second net transfer amount to zero when the second result is not less than zero; and
   summing the results of converting the first and second net transfer amounts to amounts of the intermediate resource type to determine the net intermediate resource type quantity for the selected resource path.

10. The method of claim 8, further comprising adjusting the reservoir resource quantity based on the monitoring of the selected resource paths in the resource transfer network.

11. The method of claim 10, wherein the reservoir resource quantity is increased when the monitoring of the selected resource paths indicates that a resource transfer on at least one of the selected resource paths used a one-leg route with a cost higher than a threshold cost for the at least one of the selected resource paths.

12. The method of claim 10, wherein the reservoir resource quantity is decreased when the monitoring of the selected resource paths indicates that a leg that can be used to form two-leg routes for a selected resource path was not used to form any routes for any resource transfers for the selected resource path during a monitoring period.

13. The method of claim 7, wherein the monitoring of the selected resource paths is based on access to a network of resource tracking computing devices.

14. The method of claim 7, wherein the monitoring of the selected resource paths occurs over a monitoring period which occurs during a distribution period, and wherein the instructions are generated and caused to be executed at the end of the distribution period.

15. The method of claim 8, wherein determining the quantity of an intermediate resource type to transfer into one of the plurality of resource pools in the resource transfer network that is associated with a leg that can be part of a route with two legs for at least one of the selected resource paths comprises:

assigning a portion of the reservoir resource quantity to each of the selected resource paths;

for each selected resource path:

determining a total volume of the intermediate resource type that could be transferred across the selected resource path through routes formed using any legs with which the one of the plurality of resource pools is associated, excluding the volume of the routes with costs higher than a threshold cost;

determining a total volume of the intermediate resource type that could be transferred across the selected resource path through routes with two legs formed using legs associated with any resource pools in the resource transfer network;

dividing the total volume for the legs associated with the one of the plurality of resource pools by the total volume for the legs associated with any resource pool to determine a share for the one of the plurality of resource pools of the portion of the reservoir resource quantity assigned to the resource path; and multiplying the share for the resource pool by the portion of the reservoir resource quantity assigned to the resource path to determine the quantity of the intermediate resource type to transfer into the one of the plurality of resource pools.

16. A computer-implemented system comprising:

a computing device adapted to monitor a plurality of selected resource paths in a resource transfer network, determine a quantity of an intermediate resource type to transfer into each of a plurality of resource pools in the resource transfer network, each of the plurality of resource pools associated with at least one leg that can be part of a route with two legs for at least one of the selected resource paths, and generate and cause to be executed instructions decrementing a register in a repository resource pool by the determined quantities of the intermediate resource type to be transferred into the plurality of resource pools in the resource transfer network and incrementing a register in each of the plurality of resource pools in the resource transfer network by the determined quantity of the intermediate resource type to be transferred into that resource pool when the determined quantity is greater than zero, wherein the determined quantities of the intermediate resource type to be transferred into the plurality of resource pools in the resource transfer network are further based on portions of a reservoir resource quantity assigned to the plurality of selected resource paths.

17. The computer-implemented system of claim 16, wherein the computing device is further adapted to monitor a plurality of resource transfers on selected resource paths in a resource transfer network, determine a net intermediate resource type quantity for each of the selected resource paths, and determine a reservoir resource quantity based on the net intermediate resource type quantity for each of the selected resource paths.

18. The computer-implemented system of claim 17, wherein the computing device is further adapted to determine a net intermediate resource type quantity for a selected resource path by determining a first result by reducing a total quantity of a front resource type that is transferred in at the start of a first half of the selected resource path by a total quantity of the front resource type that is transferred out at the end of a second half of the selected resource path, setting a first net transfer amount to the absolute value of the first result when the first result is less than zero or setting the first net transfer amount to zero when the first result is not less than zero, determining a second result by reducing a total quantity of a back resource type transferred in at the start of the second half of the selected resource path by a total quantity of the front resource type that is transferred out at the end of the first half of the selected resource path, setting a second net transfer amount to the absolute value of the second result when the second result is less than zero or setting the second net transfer amount to zero when the second result is not less than zero, summing the results of converting the first and second net transfer amounts to amounts of the intermediate resource type to determine the net intermediate resource type quantity for the selected resource path.

19. The computer-implemented system of claim 16, wherein the computing device is further adapted to monitor the selected resource paths over a monitoring period which occurs during a distribution period, and wherein the instructions are generated and caused to be executed at the end of the distribution period.

20. The computer-implemented system of claim 17, wherein the computing device is further adapted to determine the quantity of an intermediate resource type to transfer into one of the plurality of resource pools in the resource transfer network that is associated with a leg that can be part of a route with two legs for at least one of the selected resource paths by assigning a portion of the reservoir resource quantity to each of the selected resource paths, and for each selected resource path, determining a total volume of the intermediate resource type that could be transferred across the selected resource path through routes formed using any legs with which the one of the plurality of resource pools is associated, excluding the volume of the routes with costs higher than a threshold cost, determining a total volume of the intermediate resource type that could be transferred across the selected resource path through routes with two legs formed using legs associated with any resource pools in the resource transfer network, dividing the total volume for the legs associated with the one of the plurality of resource pools by the total volume for the legs associated with any resource pool to determine a share for the resource pool of the portion of the reservoir resource quantity assigned to the resource path, and multiplying the share for the resource pool by the portion of the reservoir resource quantity assigned to the resource path to determine the quantity of the intermediate resource type to transfer into the one of the plurality of resource pools.

* * * * *